United States Patent
Shrikhande et al.

(10) Patent No.: US 10,540,867 B1
(45) Date of Patent: Jan. 21, 2020

(54) HARDWARE-ASSISTED MONITORING AND REPORTING

(71) Applicant: Innovium, Inc., San Jose, CA (US)

(72) Inventors: Kapil Vishwas Shrikhande, Berkeley, CA (US); David Alan Jarosh, Santa Clara, CA (US); William Brad Matthews, San Jose, CA (US)

(73) Assignee: Innovium, Inc., San Jose, CA (US)

( * ) Notice: Subject to any disclaimer, the term of this patent is extended or adjusted under 35 U.S.C. 154(b) by 166 days.

(21) Appl. No.: 15/729,386

(22) Filed: Oct. 10, 2017

(51) Int. Cl.
H04L 29/06 (2006.01)
G08B 5/38 (2006.01)
G08B 5/36 (2006.01)
H04L 12/26 (2006.01)

(52) U.S. Cl.
CPC .................. *G08B 5/38* (2013.01); *G08B 5/36* (2013.01); *H04L 43/04* (2013.01)

(58) Field of Classification Search
CPC ....................................................... H04L 43/04
See application file for complete search history.

(56) References Cited

U.S. PATENT DOCUMENTS

| | | | | |
|---|---|---|---|---|
| 10,292,233 B1 * | 5/2019 | Udavant | ............ | H05B 33/0863 |
| 2010/0099426 A1 * | 4/2010 | Lozinski | ............. | H04L 41/0677 |
| | | | | 455/450 |
| 2014/0280907 A1 * | 9/2014 | Rothstein | ................ | H04L 43/18 |
| | | | | 709/224 |
| 2017/0163519 A1 * | 6/2017 | Bowers | ................... | H04L 43/50 |

* cited by examiner

*Primary Examiner* — Adnan M Mirza
(74) *Attorney, Agent, or Firm* — Wong & Rees LLP; Karl T. Rees

(57) ABSTRACT

Approaches, techniques, and mechanisms are disclosed for monitoring and reporting status information in a computing device. According to one embodiment, status messages are generated with respect to a subsystem of a computing system, such as a computer chip configured to perform network switching and routing functions in a network device. The status messages convey status information, such as configuration and/or operational states, metrics, or other statistics. A message decoder within the system may be configured to receive and analyze the status messages. Based thereon, the message decoder generates output data in a specific format that controls an output device, such as an LED array. The message decoder then sends the output data to the output device. Enabling the reporting of status information through LED indicators and other typically custom and proprietary output devices is thus greatly simplified. A status chain for collecting and reporting status information is also described.

22 Claims, 8 Drawing Sheets

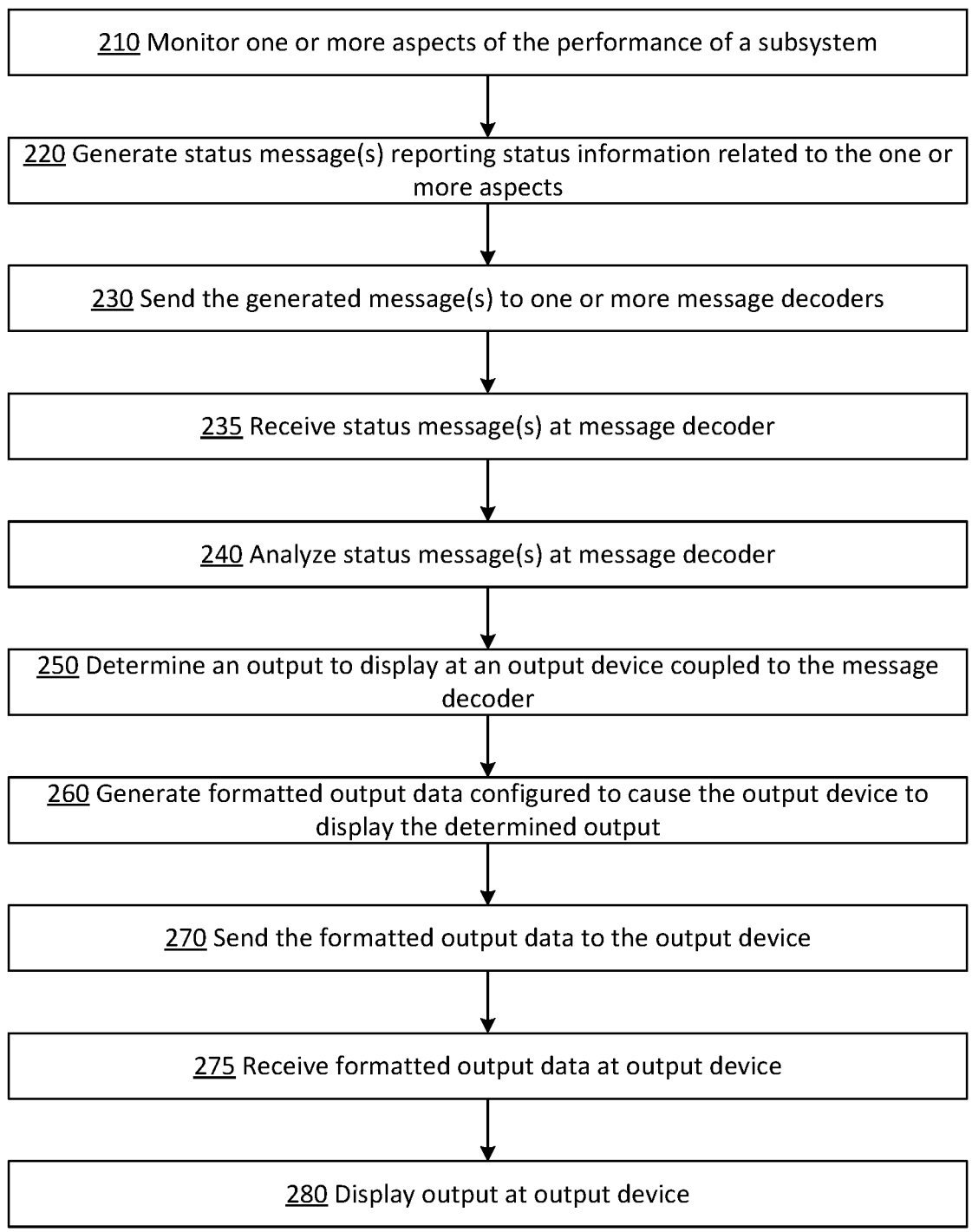

HARDWARE-ASSISTED MONITORING AND REPORTING

TECHNICAL FIELD

Embodiments relate generally to data reporting and monitoring and, more specifically, to techniques for visually reporting data concerning the operation of a computing device.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Computing devices have long utilized light-emitting diodes ("LEDs") as visual indicators to report status information. For example, in network devices such as switches or routers, it is common to associate an LED with each physical interface of the network device. When a physical connection is active, the LED associated with that interface is typically lit. In some devices, the color of the LED may vary depending on the speed of the physical connection (e.g. orange for 100 Mbps versus green for 1 Gbps). In some devices, the LED may flash rapidly whenever there is network activity over the associated physical connection. In other devices, there may be more than one LED associated with a port—one that indicates the existence of a physical connection, and another that flashes whenever there is activity over the network connection. Similarly, a device may have a power LED that indicates power being supplied to the device, or an LED that flashes or changes colors to indicate the existence of an error condition.

However, the amount of information conveyed using such indicators has conventionally been very limited. For example, in the context of network devices, simple awareness of the existence of a physical connection or network activity over that connection is of limited benefit in a data center equipped with hundreds or thousands of such devices. To access information such as utilization and congestion statistics, a network device may therefore further include any of a number of types of remote interfaces accessible over a network, such as web interfaces or command-line interfaces, by which a network administrator may access the information. Locating and accessing such interfaces can often be cumbersome for a network administrator, and it is often not immediately discernable which physical device is associated with which remote interface.

Moreover, complex computing devices are often comprised of a number of components manufactured by different entities. Often, the component that has information to report is manufactured by an entity other than the entity responsible for integrating LED indicators into the device. For example, it is common in network devices for one company to produce chips responsible for implementing network switching functionality (e.g. including managing traffic that enters and/or leaves the device over physical ports), while a different company may be responsible for integrating the chip into a system that includes other components such as a general-purpose processor and an array of LEDs that is integrated into the system housing.

Utilization of LED indicators in such complex devices requires time-consuming coordination between entities, involving device-specific and/or proprietary communications between system components and the LED indicators. Consequently, utilization of LED indicators is typically limited to reporting a small set of standard items of information. Moreover, reporting by LED indicators often comes at the expense of increased (and undesirable) utilization of a general-purpose processor to process raw status information and convert that information into a data format suitable for driving the LED indicators.

BRIEF DESCRIPTION OF THE DRAWINGS

The present inventive subject matter is illustrated by way of example, and not by way of limitation, in the figures of the accompanying drawings and in which like reference numerals refer to similar elements and in which:

FIG. 2 illustrates an example flow for displaying status indicators related to the performance of a switching subsystem or other status-reporting subsystem;

DETAILED DESCRIPTION

Figure 1A:
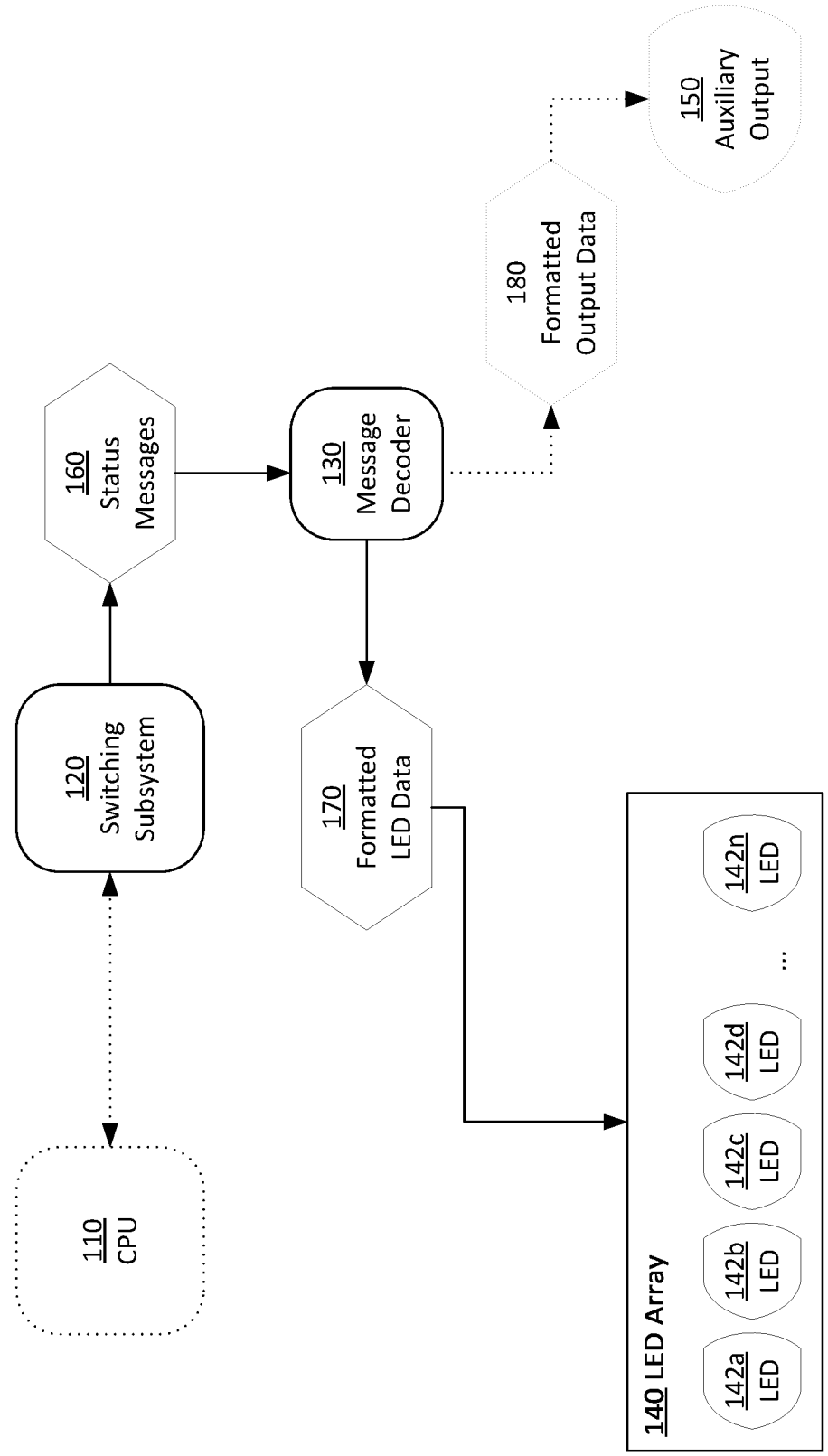
FIG. 1A is an illustrative view of various aspects of an example system in which the techniques described herein may be practiced.

In the following description, for the purposes of explanation, numerous specific details are set forth in order to provide a thorough understanding of the present inventive subject matter. It will be apparent, however, that the present inventive subject matter may be practiced without these specific details. In other instances, well-known structures and devices are shown in block diagram form in order to avoid unnecessarily obscuring the present inventive subject matter.

Embodiments are described herein according to the following outline:

1.0. General Overview
   2.0. Structural Overview
   2.1. LED Array
   2.2. Switching Subsystem
   2.3. Status Messages
   2.4. Message Decoder
   2.5. Auxiliary Output Device
   2.6. Miscellaneous
   3.0. Functional Overview
   4.0. Example Status Reporting Subsystem
   4.1. Status Chain
   4.2. Central Storage Unit
   4.3. Message Generator
   4.4. Example Functional Implementation
   5.0. Example Status Messages 5.1. Ethernet Status Message
5.2. Queue Status Message
5.3. Buffer Status Message
5.4. Physical Status Message
5.5. Port Status Message
5.6. Control Path Status Message
5.7. Interrupt/Debug Status Message
6.0. Example Embodiments
7.0. Implementation Mechanism—Hardware Overview
7.1. Example Network
7.2. Example Network Device
7.3. Example Computing Device
8.0. Extensions and Alternatives

1.0. GENERAL OVERVIEW

Approaches, techniques, and mechanisms are disclosed for monitoring and reporting status information in a computing device. According to one embodiment, status messages are generated with respect to a subsystem of a computing system, such as a computer chip configured to perform network switching and routing functions in a network device. The status messages convey status information, such as configuration and/or operational states, metrics, or other statistics. A message decoder within the system may be configured to receive and analyze the status messages. Based thereon, the message decoder generates output data in a specific format that controls the output of an output device, such as an LED array. The message decoder then sends the output data to the output device.

In this manner, among other advantages, the described techniques and apparatuses make it easier for system designers and integrators to enable the reporting of status information through LED indicators and other typically custom and proprietary output devices. In an embodiment, the status messages are generated in a common format, such that the same subsystem may be utilized in a variety of systems having a variety of output device configurations, without modification to the status message reporting function. In an embodiment, the common format is extensible, such that new fields of information may be reported in updated versions of the subsystem (e.g. in new hardware produced for later versions of the computing systems, or in a firmware upgrade to existing hardware). Likewise, the message decoder may be upgraded to support more advanced reporting techniques independently of updates to the subsystem.

Moreover, in an embodiment, a computing system may include any number of message decoders configured to receive status messages, each controlling a different output device or interface. Or a message decoder may target multiple output devices. Moreover, message decoders may be routed to external processors, controllers, or even computing systems, which may be configured to perform non-output related tasks with the status messages. The same status message mechanism used to drive an LED array may thus at the same time be utilized for logging, system management, or other tasks.

In an embodiment, a subsystem that generates status messages may utilize a chain of nodes deployed strategically throughout the components of the subsystem to collect status information. This chain is referred to herein as a status chain. Each node is coupled to or embedded in one or more components, from which it collects status information. Each node encodes this status information as a set of bits that it sends along a discrete bus. A node at the end of the chain writes the bits to a central storage unit. A message generator subsequently reads and interprets these status bits as values for various component states and metrics. The message generator generates status messages comprising fields whose values correspond to, or are derived from, these component states and metrics. The message generator then forwards the status messages out of the subsystem (e.g. towards a message decoder that has been coupled to the subsystem).

In other aspects, the inventive subject matter encompasses computer apparatuses and/or computer-readable media configured to carry out the foregoing techniques.

2.0. STRUCTURAL OVERVIEW

FIG. 1A is an illustrative view of various aspects of an example system 100 in which the techniques described herein may be practiced, according to an embodiment. System 100 is a computing device, such as a network switch or router, comprising computing hardware configured to implement the various logical components described herein, including components 110-180. For instance, the hardware may include one or more Application-Specific Integrated Circuits ("ASICs"), Field Programmable Gate Arrays ("FPGAs"), Complex Programmable Logic Devices ("CPLDs"), integrated circuits, logic gates, registers, memories, and/or other electronic components, configured to implement the various components described herein.

In some embodiments, the hardware may further include one or more general purpose processors. For example, the one or more computing devices may include one or more memories storing instructions for implementing certain components described herein, one or more hardware processors configured to execute the instructions stored in the one or more memories, and various data repositories in the one or more memories for storing data structures utilized and manipulated by the various components.

2.1. LED Array

System 100 comprises an array 140 of LED indicators 142a-142n (collectively "LED indicators 142"). LED indicators 142 may be of any suitable type and color, depending on the specific system 100, including single-color LEDs and multi-color LEDs, which may or may not be dimmable. LED indicators 142 may be arranged in any suitable arrangement, including, without limitation, lines and matrices. Typically, LED indicators 142 are mounted to external casing of system 100, such as to a front panel, though they may also or instead be mounted inside system 100 (e.g. on a PCB) or even on an external assembly communicatively coupled to system 100.

In some embodiments, the position of some or all of LED indicators 142 relative to the physical locations of certain components of system 100 serves to indicate some aspect of what the LED indicators 142 indicate. For example, in a network device, there may be a set of LED indicators 142 above each physical ethernet jack, to indicate the state of the port(s) associated with each jack, and/or next to a power button, to indicate power status information.

Array 140 includes or is coupled to an LED matrix driver or other suitable controller. The controller is configured to receive formatted LED data 170 that has been formatted specifically for driving the LED array 140. The formatted LED data 170 instructs the controller to send electrical current to specific LEDs 142 that cause the LEDs to emit light for a period of time (e.g. a refresh rate of the array 140). The formatted LED data 170 may instruct the controller to send signals that cause an LED 142 to light continually, or that flash the LED 142 in accordance to a pattern or other order determined by the controller. Depending on the specific LED array 140 used in the system 100, the signals may further control the color and/or intensity of that light at any given time. The formatted LED data 170 may take a variety of forms, depending on the controller, such as an array of three-bit RGB values for a tri-color LED array 140.

In an embodiment, an LED array 140 may further support a variety of more sophisticated effects, which the formatted LED data 170 may cause or specify. For instance, the LED array 140 may support flicker rates for LEDs 142. An LED 142 may pulse between one intensity or another (or no intensity) for a specified number of seconds. An LED 142 may further support color transitions, or color transition sequences, over specified amounts of time. For instance, the LED 142 may oscillate between red and orange, or between blue, green and purple. Of course, an LED array 140 may further support any combination of these effects as well.

Different systems 100 may comprise different types of LED arrays 140. These different types of LED arrays 140 are often controlled by differently-formatted LED data 170. Different formats of LED data 170 may be necessitated by the different numbers, arrangements, and/or types of LEDs 142n in each array 140. For instance, the data used to control an LED array 140 with a 7×2 matrix of single-color LEDs 142 would clearly be different from the data used to control an LED array 140 with a 10×4 matrix of multi-color LEDs 142. Different formats of LED data 170 may also or instead be necessitated by the controller. For example, different controllers may be configured to utilize different input protocols.

2.2. Switching Subsystem

System 100 further comprises a status reporting subsystem such as switching subsystem 120. Switching subsystem 120 may be, for example, one or more hardware components configured to collectively perform network routing and switching tasks. Switching subsystem 120 may be or comprise, for instance, one or more ASICs, FPGAs, or other integrated circuits. These circuits may include logic gates, registers, memories, and other electronic components configured to implement network switching tasks.

Switching subsystem 120 may be physically coupled to one or more communication interfaces, such as ethernet ports (not depicted), by which the data switched and/or routed by switching subsystem 120 is received and sent. Generally, switching subsystem 120 receives messages via these communication interfaces, determines destinations to send the messages, and then sends the messages out other communication interfaces corresponding to those destinations. Switching subsystem 120 may further comprise a variety of components configured to perform a variety of processing tasks with respect to this data, such as explained in other sections.

Switching subsystem 120 may, in some embodiments, be a self-contained switch device 120 (e.g. a computing "chip", a system-on-a-chip, a printed circuit board, etc.) supplied by a first entity to a system integrator charged with integrating the switch device 120 into a larger system 100. This larger system 100 may comprise various packaging and casing, led array(s) 140, printed circuit board(s), a power supply, physical jacks for network cabling, transceivers for wireless network communications, storage units, and/or other coupled peripheral components. Optionally, such a system integrator may provide additional functionality through a separate processor 110 coupled to the switching subsystem 120, and/or any other additional component(s).

2.3. Status Messages

Switching subsystem 120 comprises a reporting component configured to generate status messages 160 on a periodic basis and/or at other intervals. The reporting component may generate status messages 160 to report a variety of status information. The status information may report, for example, state information or other metrics related to interfaces or ports, power states, memory or other resource utilization, or other operational aspects of subsystem 120. As described subsequently, these status messages 160 may be utilized to drive status indicators such as LED array 140 and/or determine information to display on other output devices 150.

The reporting component of switching subsystem 120 is configured to generate status messages in a common format, regardless of the system 100 in which switching subsystem 120 is embedded. Thus, for instance, a producer of switching subsystem 120 may supply the same (or similarly configured) switching subsystems 120 to different system integrators manufacturing differently configured systems 100 (e.g. systems having different numbers of ports, systems having different numbers of LEDs per port, systems having different status reporting colors or other conventions, systems having different classifications of system states, systems with or without a processor 110, systems supporting different additional features, etc.), without necessarily modifying the reporting components of the switching subsystems 120 to support the different configurations into which the switching subsystems 120 are to be integrated.

In an embodiment, the status messages conform to a format that is flexible to support the inclusion (or exclusion) of many different types of fields, depending on the status information being conveyed. For instance, some status messages 160 may relate directly to an ethernet interface, and thus comprise fields of information suitable for reporting ethernet status information. Another set of status messages 160 may relate to physical status information, such as power or temperature, and thus comprise fields suitable for reporting physical status information. Type information or other metadata within the status messages 160 may be utilized to determine how the status messages 160 should be interpreted (e.g. what data corresponds to what field). In an embodiment, the format is extensible to support additional fields as improvements are made to the switching subsystem 120 (e.g. new firmware, upgraded hardware, etc.). In an embodiment, the status messages are formatted using an extensible packet format, which is capable of supporting the foregoing features.

In yet other embodiments, a fixed and/or non-extensible format may be utilized instead to report the status information. Further examples of status message types and contents are given in other sections.

2.4. Message Decoder

System 100 further comprises a message decoder 130 that is coupled both to the switching subsystem 120 and the LED array 140. The message decoder 130 receives status messages 160 and interprets the information conveyed therein. Based on the information within the latest status messages 160, the message decoder determines an output for the LED array 140 to currently display. Generally, the "output" of the LED array 140 is the arrangement of light produced by LED indicators 142, which is itself a function of the physical arrangement of the LED indicators 142, and the electric power (or lack thereof) supplied to the LED indicators 142 by the controller of the array 140. The message decoder 130, then generates formatted LED data 170 sufficient to instruct the LED array 140 to produce this output, and sends the formatted LED data 170 to the LED array 140. In this manner, the message decoder 130 is said to "drive" the LED array 140.

For instance, the message decoder 130 may analyze one or more status messages 160 and determine that ports 1, 8, and 9 of system 100 are connected via 1 Gbps connections. The message decoder 130 may thus send formatted LED data 170 that lights LED indicators 142 for ports 1, 8, and 9 a color that indicates a 1 Gbps connection. As another example, the message decoder 130 may analyze one or more status messages and determine that a queue congestion level associated with a particular traffic flow or class is above a defined threshold. The message decoder 130 may thus send formatted LED data 170 that lights an LED indicator 142 associated with the traffic flow or class a certain color.

Message decoder 130 may determine when the status information warrants lighting a certain LED indicator 142 based on a variety of factors. Generally, the lighting of a certain LED indicator 142 and/or the way in which the LED indicator 142 is lit is said to indicate a certain behavior or event, such as a component of the switching subsystem 120 operating in a certain state or encountering a certain condition, or a combination of behaviors and events. For example, the lighting of a certain LED indicator 142 may indicate that an associated component of the switching subsystem 120 is in use, or in a specific operational state. As another example, a pulsing effect might be used to indicate that a certain metric is a certain operational range. An LED indicator 142 might pulse red for three seconds for a first specific behavior or event, and pulse green for ten seconds for another behavior or event. As another example, an LED indicator 142 might transition continuously between red, blue, and green for one behavior, and transition between blue, red, and orange for another behavior.

Different combinations of effects, like flicker rate and color transitions, might also be used to indicate different behaviors or events, or combinations thereof. As an example, a combination of color and flicker rate may be utilized to communicate status information related to a congestion event. An LED indicator 142 may be lit green when the status messages 160 do not indicate that an associated port is in a congested state (either indirectly by comparison of a reported utilization rate to a congestion threshold, or by directly reporting a congestion state). The same LED indicator 142 may be lit red when the status messages 160 indicate that the associated port is in a congestion state. The same LED indicator 142 may flicker red when, in addition to indicating a congestion state, the status messages 160 report dropped packet events. The rate of packet drops/loss may determine the flicker rate (i.e. if many packets are being dropped, the LED indicator 142 may flicker rapidly).

In an embodiment, the fact that the metric has a target value or is within a target set of values indicates a certain behavior or event that is to be reported. For example, message decoder 130 may be configured to associate a metric with each LED indicator 142. When the metric has a certain target value, or more generally falls within a range or other target set of values, the message decoder 130 may determine to light the associated indicator 142. Optionally, an effect such as color, intensity, flicker rate, color transition, color transition, or combination thereof, may be associated with the target set of values, and the message decoder 130 may thus determine to light the indicator 142 with the associated color and/or intensity.

In some embodiments, an indicator 142 may have multiple target sets of values, each associated with a different color, intensity, or other effect. The target set of values, and associated metrics and indicators 142, may be fixed for the message decoder 130, or controlled programmatically based on data stored within some memory coupled to the message decoder 130.

Moreover, there may be multiple metrics associated with an indicator, each having one or more target sets of values. Depending on the specific system 100, the indicator may be lighted only if each metric has a value within a corresponding target set of values for the metric, or if any metric has a value within its corresponding target set of values. In some embodiments, each metric may be associated with a different color and/or intensity. In an embodiment, each metric may have one or more target sets of values, each associated with a different color and/or intensity. In such embodiments, a priority scheme between metrics or target sets of values may be utilized to determine the color and/or intensity for the associated indicator 142 when multiple metrics match one of their indicated target sets of values. These or any of a variety of other algorithms may be implemented by message decoder 130 to determine the appropriate output for the LED array 140.

Message decoder 130 may determine the metrics using any suitable statistical calculation techniques. For example, the message decoder 130 may simply copy a metric value from the latest status message 160 that includes a field that specifies the metric value. As another example, message decoder 130 may calculate a metric value using a function of the latest values of two or more specified fields reported by status messages 160. These values may be found in a single status message 160, or in multiple separate status messages 160 of different types. Or, the message decoder 130 may compute the value for a metric as a statistical function of the values of a certain set of fields in a last number of status messages 160 having those fields, or in all messages 160 received within a specific period of time. Examples of such statistical functions include, without limitation, average, median, mode, moving average, time-weighted moving average, minimum, maximum, and so forth. Of course, any other suitable calculations may also or instead be performed based on status messages 160.

In some embodiments, the message decoder 130 may be relatively unsophisticated, in that it merely maps specific states indicated by the status messages to specific LED indicators (and/or colors, luminance, or visual effects). The reporting component of subsystem 120 may instead include state determination logic to perform determinations similar to the foregoing, and then communicate a determined state to the message decoder 130. For example, rather than sending an indication that a specific port has a utilization of 80%, the reporting component may classify this utilization rate as corresponding to a "congested" state and simply send an indicator corresponding to that congestion state in the utilization field of a status message 160.

Message decoder 130 may repeat the process of analyzing status messages and generating formatted LED data 170 periodically (or at other intervals) over time, to reflect changes indicated by newly received status messages 160 (if any). For instance, message decoder 130 may generate formatted LED data 170 at intervals corresponding to a refresh rate of the LED array 140 (i.e. corresponding to how quickly the LED array 140 can be updated). In the time between a given interval, message decoder 130 may receive and analyze any number of additional status messages (including zero), which in turn may change the output determined by the message decoder 130 (and consequently, the next formatted LED data 170 that the message decoder 130 will send). Alternatively, or additionally, message decoder 130 may generate formatted LED data 170 each time a certain event occurs, such as receiving a status message, receiving a specified number of status messages, receiving a certain type of status message, and so forth.

In some embodiments, the LED array 140 may be configured to remain in the same state as the most recently received formatted LED data 170. Hence, in such embodiments, if no status information has changed, message decoder 130 may forego transmission of formatted LED data 170 until new status messages 160 have been received indicating changes to status information that affect the output of the LED array 140. In other embodiments, message decoder 130 may need to continually supply formatted LED data 170 at a specified refresh rate, even if the formatted LED data 170 remains unchanged. Hence, even when no status message has been received, or no status change is indicated that affects the output of the LED array 140, message decoder 130 will repeatedly transmit the same formatted LED data 170.

In either case, if effects such as flashing, changing colors, or changing intensity of LED indicators 142 are needed to convey the current status information, message decoder 130 may need to continually send updated formatted LED data 170 to LED array 140 to cause the LED array 140 to display the effect, even if the status information remains unchanged since the last formatted LED data 170 was sent.

Message decoder 130 may be implemented by any suitable hardware. For instance, message decoder 130 may be implemented as a programmable logic device, such as a CPLD or FPGA. Message decoder 130 might instead take the form of other types of integrated circuits, such as an ASIC, or yet other electronic circuitry. In other embodiments, message decoder 130 may be implemented using software executed by a general-purpose processor, such as processor 110 or another processor. However, utilization of dedicated hardware may be preferable in certain embodiments to avoid unnecessary utilization of processor 110.

Since, as already described, different systems 100 may have different LED arrays 140 driven by differently formatted LED data 170, it follows that message decoders 130 may be configured differently for different LED arrays 140. The message decoder 130 may be supplied by the same entity as switching subsystem 120, or separately by system integrators or other entities utilizing specifications for the status message format.

In some embodiments, it may be preferable that the message decoder be programmable (e.g. a programmable logic device or software) so that it may be updated to support additional functionality over time. Hence, for example, system 100 may be updated to support design changes (e.g. improvements in the way LED array 140 indicates status information) and/or new status information that becomes available from an update to switching subsystem 120.

In some embodiments, the entity providing switching subsystem 120 may provide a system integrator with a message decoder 130 (or specifications for programming a message decoder 130) that is configured only to drive the display of a basic or default set of status information at the system integrator's LED array 140. The "default" message decoder may implement one or more protocols and formats used for the most common LED array interfaces (e.g. serial-to-parallel conversion), while also supporting configurable protocols for non-standard interfaces.

If the message decoder 130 is programmable, however, the system integrator may subsequently enhance the system 100 by reprogramming the message decoder 130 to drive the display of additional status information. A system integrator may thus define protocols and, potentially, information displays that suit their needs.

In an embodiment, a message decoder 130 may be configured to adjust the status information displayed by certain LED indicators 142 based on a configuration setting of the system 100. Such a configuration setting may be controlled by, for example, a physical switch or button mounted on the system 100, a GUI on a remote interface (e.g. wireless hand-held monitor) or web interface, etc. For instance, a user might flip a switch to change LED indicators 142 from displaying connectivity indicators to displaying congestion indicators.

2.5. Auxiliary Output Device

System 100 optionally includes or is coupled to, in some embodiments, one or more auxiliary output devices 150. An auxiliary output device 150 is a component, separate from LED array 140, configured to display status information. The auxiliary output device 150 may take a variety of forms, including, without limitation, a system-mounted Liquid Crystal Display ("LCD") screen, a seven-segment display, an interface for communicating with another system component (such as Peripheral Component Interconnect Express ("PCIe") interface), an interface for communicating with an external device, another LED array 140, an audio device, and so forth. Although termed "auxiliary" for explanatory purposes, it will be recognized that auxiliary output device 150 may, in some embodiments, be considered the main or primary indicator display of system 100.

According to an embodiment, a message decoder 130 may be configured to also or instead send data to the auxiliary output device 150 based on status messages 160. To this end, message decoder 130 may be configured to generate output data 180 to drive the auxiliary output device 150, in the same manner as message decoder 130 generates the formatted LED data 170. Of course, the output data 180 will in all likelihood be formatted differently than the formatted LED data 170, in that it will need to be in a format expected for the auxiliary output device 150.

For example, the auxiliary output device 150 may be a small LCD screen capable of displaying a few lines of text, or a graphical dashboard. The message decoder 130 may be configured to send output data 150 that controls the text or graphics that are shown, which text or graphics may indicate some aspect of the status information in status messages 160.

In yet other embodiments, the auxiliary output may not necessarily be a device or component capable of directly displaying data, but rather a processor or microcontroller configured to collect status information and perform other tasks based thereon (e.g. send notification messages to a user, take corrective actions that affect the operation of one or more devices in a network, etc.). Message decoder 130 may simply forward status messages 160 to the processor or microcontroller, either by a direct connection or via a network. Or, message decoder 130 may first process the status messages 160 and generate summary reports to send to the processor or microcontroller.

In some cases, the output data 180 may reflect the same status information as indicated by LED array 140. For example, the LED indicators 142 may simply indicate a state associated with a metric (e.g. "utilization"), while the auxiliary output device 150 may provide the actual value of the metric (e.g. a percent or count). In other cases, the output data 180 may reflect entirely different status information than indicated by LED array 140. Message decoder 130 may, for example, associate some metrics with indicators 142 in the LED array 140, and associate other metrics with information to be displayed by the auxiliary output device 150. The indicators 142 might be utilized to display simple status indicators for binary metrics, such as "connected" or "not connected," while the auxiliary output device 150 may be reserved for displaying status information for metrics that are better communicated in terms of quantities or textually, such as a measure of buffer utilization or queue size.

In an embodiment, there may be different message decoders 130 for different outputs, including one for the LED array 140 and one for each auxiliary output device 150. Switching subsystem 120 may be coupled directly to each message decoder 130, and provide each status message 160 to each message decoder 130. Or, system 100 may include a forwarding unit (not depicted) in the switching subsystem 120, or between the switching subsystem 120 and the message decoders 130. The forwarding unit is configured to filter the status messages 160 to avoid sending messages 160 to a decoder 130 when not needed. In other words, the forwarding unit is configured to determine which status messages 160 to send to which message decoders 130.

The forwarding unit may filter the status messages 160 based on implicit information (such as an association between message fields and specific message decoders), or based on associations between certain types of status messages 160 and certain message decoders 130. The forwarding unit may, for example, send interface-related status messages 160 to a message decoder 130 associated with LED array 140, and send buffer or queue-related status messages 160 to a message decoder 130 associated with an auxiliary output device 150. In some embodiments, the switching subsystem 120 may be configured to more directly target specific messages 160 to specific types of message decoders 130. Thus, for example, each status messages 160 may include a field that indicates which types of message decoders 130 should receive the message (e.g. a target type of 0x1 would be intended for LED-based decoders, a target type of 0x2 would be intended for LCD-based decoders, and so forth).

In an embodiment, some or all of status messages 160 are forwarded to an aggregating unit outside of system 100. The aggregating unit may be a separate device configured to receive status messages 160 from multiple systems 100 (e.g. for a cluster of network switches in a data center). The messages 160 are forwarded either by message decoder 130 or a forwarding unit. The aggregating unit may include its own display device (e.g. an LED array 140, an LCD screen, etc.), at which the aggregating unit displays status information for multiple systems 100, using its own message decoder or equivalent component, and based on the same techniques described herein. Optionally, or instead, the aggregating unit may perform other actions such as changing configurations of certain systems, sending notification messages, sending wireless status information that may be displayed on a remote device carried by an operator in the vicinity of the aggregation unit, writing status information to a log, etc.

For instance, a number of systems 100 may be network switching devices mounted on a same rack (or otherwise within close vicinity of each other). Each of the systems 100 may itself lack surface area on which to mount an LED array 140 or LCD display of sufficient size to report desired status information. Or, some or all of the systems 100 may be hidden in such a way that their displays are not readily visible. An aggregating unit may be mounted to the same rack, or in close vicinity of the rack. This aggregating unit may include a large enough LED array 140 or LCD screen to display the desired status information, and/or be at eye-level so that the status information may be more easily seen. Optionally, the aggregating unit may further aggregate statistics across systems 100 and thus deliver aggregated status information for the entire cluster.

2.6. Miscellaneous

System 100 illustrates only one of many possible arrangements of components configured to provide the functionality described herein. Other arrangements may include fewer, additional, or different components, and the division of work between the components may vary depending on the arrangement. For example, in some embodiments, LED array 140 may be omitted, in favor of auxiliary output device 150. As another example, in an embodiment, system 100 may further include additional subsystems that deliver status messages 120 to message decoders 130. Moreover, as explained above, there may be multiple message decoders 130. Also, in at least one embodiment, a message decoder may be integrated directly into the switching subsystem 130, rather than external to the switching subsystem 130.

Figure 1B:
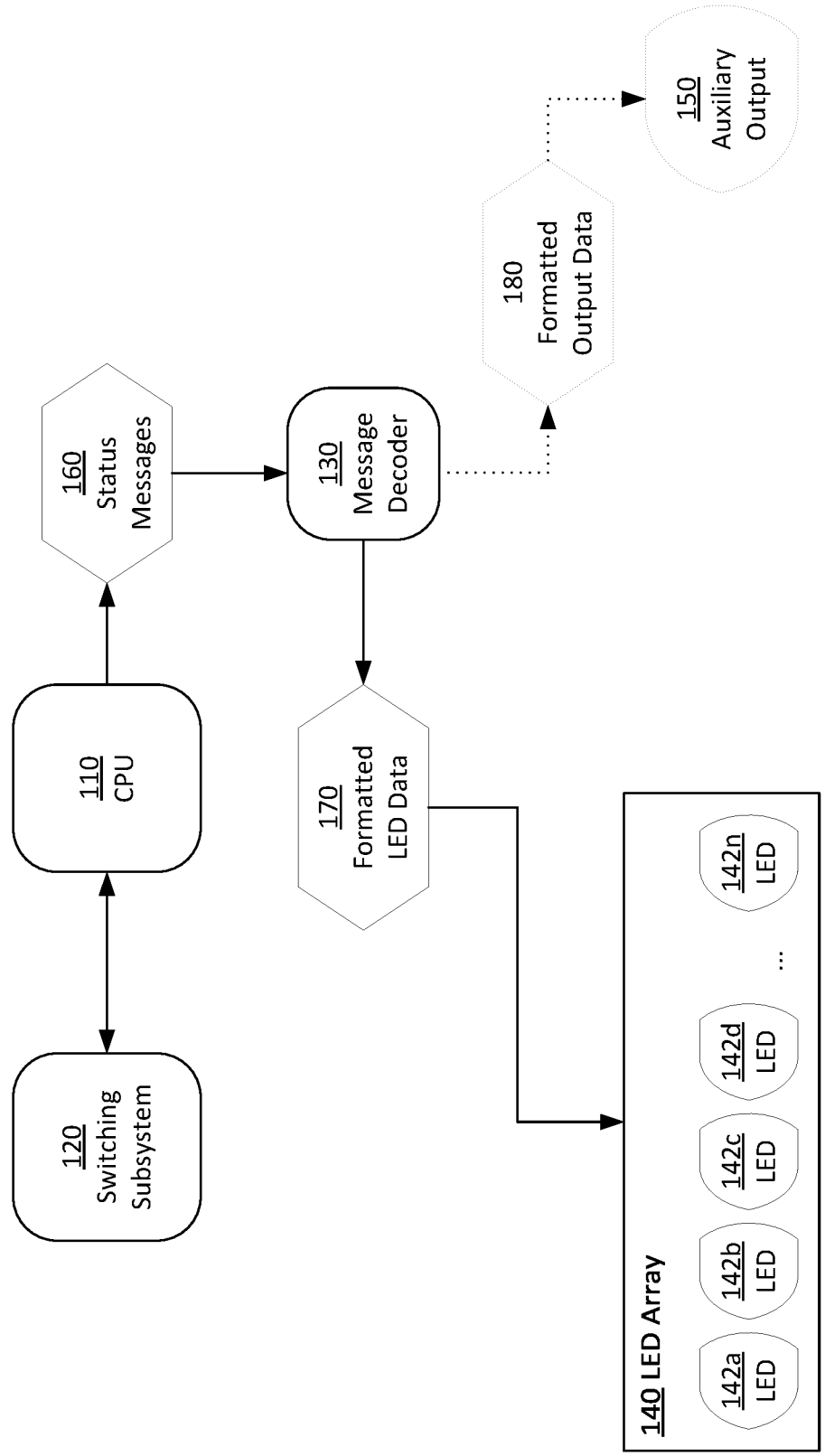
FIG. 1B illustrates an alternative architecture for the example system, in which status messages are relayed from a switching device through a processor and to a message decoder.

Furthermore, processor 110 may be eliminated, or there may be multiple processors 110. In at least one embodiment, the message decoder 130 may be coupled directly to the processor 110 instead of directly to the switching subsystem 120. For example, FIG. 1B illustrates an alternative architecture for system 100 in which status messages 130 are relayed from the switching subsystem 120 through the processor 110 and to the message decoder 130, according to an embodiment. In such embodiments, processor 110 may further be configured to process status messages 160, analyze status messages 160, perform actions based on the analysis, manipulate status messages 160, filter status messages 160, and/or generate additional status messages 160. To simplify this disclosure in view of the varying architectures, message decoder 130 and subsystem 120 in FIG. 1B are said to be connected or coupled indirectly, even though communications pass through an intermediary component (i.e. processor 110). In yet another embodiment, rather than being coupled together via an external connection, message decoder 130 may be integrated into, or packaged together with, subsystem 120 (i.e. coupled internally).

In yet another embodiment, system 100 may include multiple switching subsystems 120. For example, a switching subsystem 120 may only support a limited number of ports. A system integrator may wish to create a network device with more than that number of ports, and thus include more than one switching subsystem 120 in system 100. Each subsystem 120 may be associated with a different message decoder 130. Or, a given message decoder 130 may be coupled to more than one, or even all of these multiple subsystems 120. The message decoder 130 may receive status messages 160 for each subsystem 120, and thus generate formatted output data 170 and/or 180 that reports status information for each subsystem 120. The message decoder 130 may drive the output of a single LED array 140 or output device 150 for all subsystems 120, or each subsystem 120 may have its own LED array 140 and/or output device 150.

It will further be recognized that switching subsystem 120 is but one example of a subsystem in which may be deployed a reporting component capable of performing the techniques described herein. The described techniques may in fact be employed in any subsystem with such a reporting component (a "status reporting subsystem"), and within any suitable computing system, regardless of whether the report-enabled subsystem and/or the computing system perform network-related tasks. For instance, similar circuitry within motor vehicles, multimedia equipment, data storage devices, or "smart" home appliances or lighting may be modified to serve as report-enabled subsystems configured to practice the described techniques to collect and report status information. Moreover, within a single system, multiple subsystems of different types may each utilize the techniques described herein to deliver status messages to one or more message decoders.

However, in at least some embodiments, additional advantages are realized when the report-enabled subsystem is switching subsystem 120. Therefore, for illustrative purposes, system 100 is described with respect to a status reporting subsystem that functions as switching subsystem 120. It will be understood that in other embodiments, switching subsystem 120 may be replaced by any other status reporting subsystem, and the subcomponents of that status reporting subsystem may perform any suitable function(s) upon which status information may be reported.

3.0. FUNCTIONAL OVERVIEW

FIG. 2 illustrates an example flow 200 for displaying status indicators related to the performance of a switching subsystem or other status-reporting subsystem, according to an embodiment. The various elements of flow 200 may be performed in a variety of systems, including systems such as system 100 described above. In an embodiment, each of the processes described in connection with the functional blocks described below may be implemented using one or more integrated circuits, logic components, computer programs, and/or other hardware or software elements in any of a general-purpose computer or a special-purpose computer.

Block 210 comprises monitoring one or more aspects of the performance of a subsystem, such as of switching subsystem 120. The one or more aspects may relate to simple configuration settings or operational states, such as whether the subsystem is currently configured to operate in a specific manner, or whether certain communication link(s) are currently active. Such information may be monitored in a variety of manners, such as reading configuration data from a memory at various intervals, polling system components for the information at various intervals, listing for announcements from system components of changes in configuration or operational state, and so forth.

The one or more aspects may also or instead relate to more complex performance metrics, such as resource utilization or defined states based thereon, characteristics of network traffic processed by the subsystem, characteristics of operations recently performed by the subsystem, and so forth. An accounting mechanism to maintain such metrics may include any suitable tracking and/or counting logic, memories for storing counters or logs, logic or characterizing network traffic or operations, and so forth. While many suitable monitoring techniques are known, some example techniques that may be utilized in certain embodiments are described in: U.S. patent application Ser. No. 14/958,830, entitled "Efficient Resource Tracking," filed Dec. 3, 2015, by Matthews et al.; U.S. patent application Ser. No. 14/973, 541, entitled "Efficient Resource Status Reporting Apparatuses," filed Dec. 17, 2015, by Matthews et al.; and U.S. patent application Ser. No. 14/985,928, entitled "Efficient Resources Status Reporting Systems," filed Dec. 31, 2015, by Matthews et al. The entire contents of each of these applications are hereby incorporated by reference for all purposes.

In some embodiments, a status chain comprises nodes and a central storage unit that collectively implement at least a portion of this monitoring, as described subsequently. In other embodiments, any other suitable combination of components within (or even external to) the subsystem may perform this monitoring. In some embodiments, some aspects of operation may be monitored at different times and/or at different frequencies relative to other aspects of operation.

Block 220 comprises, based on the one or more monitored aspects, generating status messages reporting status information related to the one or more aspects. The status messages may report monitored configurations, states, and metrics directly, and/or the status messages may include information calculated or otherwise derived from the monitored configurations, states, and metrics. In an embodiment, the status information is reported as a series of fields and corresponding values. Example fields of status messages are described in other sections. In an embodiment, there may be different types of status messages for different status information. In an embodiment, the status messages are generated in a common format, such as described in other sections, which may optionally be an extensible packet format.

Blocks 210 and 220 are repeated continuously, though not necessarily at the same time. For example, the monitoring may occur asynchronously relative to the message generation. Various data describing what was monitored may be stored in a repository from which it may be read by a separate process for generating status messages. Status messages may thus be generated less (or more) frequently than metrics, configurations, and states are recorded in such a repository. Alternatively, the monitoring and message generation may be performed synchronously, such that a message is generated any time an aspect of system operation is monitored. In some embodiments, block 220 may instead only be performed any time a significant change in an aspect of system operation is monitored.

Block 230 comprises sending the generated messages to one or more message decoders, such as message decoders 130. The sending may comprise sending data out of the monitored subsystems via one or more connections, in embodiments where the message decoders are external to the monitored subsystems. The sending optionally occurs via an intermediate forwarding unit that controls which messages go to which message decoders.

Block 235 comprises receiving the status messages at a message decoder. Block 240 (and subsequent blocks) may, in embodiments with multiple message decoders, be performed for each message decoder to which a status message is forwarded.

Block 240 comprises analyzing one or more status messages at the message decoder. The analyzing may include any or all of interpreting the fields of the status messages, aggregating those fields across multiple status messages, performing calculations to generate new metrics and/or determine when certain conditions are met, and so forth.

Block 250 comprises determining an output to display at an output device coupled to the message decoder. The output device may be any suitable output device, including, without limitation, a set of one or more LED indicators such as LED array 140, an LCD display, a speaker, and so forth. In an embodiment, the "output device" is actually a communication device as opposed to a display device. That is, rather than outputting "visual" (or audible) indicators, the output device may output electromagnetic signals.

There may be, for example, an output device that takes formatted output data and sends it wirelessly (e.g. using WiFi, Infra-red, Bluetooth, or other suitable protocols) to a receiving station, which could be a Wireless Application Protocol (WAP) or a hand-held monitor held by a data center operator. To locate a system that is causing issues for the data center, the operator may walk around the data center with the hand-held monitor. As the operator approaches a given system, or cluster of systems, a message decoder 130 within the system may detect the presence of the hand-held monitor and begin streaming output data for display at the hand-held monitor. In another embodiment, the hand-held monitor may itself include a message decoder and receive status messages that are processed and translated to outputs as described herein.

Generally, block 250 comprises displaying a certain output when a certain determination that the message decoder associates with that output is made during the analysis of block 240. Block 250 may comprise, for instance, determining to light an LED indicator in a prescribed manner when the analyzing of block 240 finds that a status message has an associated field with a particular value or range of values. As another example, block 250 may comprise determining to light an LED indicator when the analysis of block 240 determines that a certain field has been at or above a certain value for the last five status messages. Block 250 may also or instead comprise determining more complex displays, such as a pattern of colors to light multiple LED indicators in response to a certain determination in block 240, or textual output to display on the output device to reflect metrics found or derived from the status messages. Other examples of the types of outputs and associated determinations are given elsewhere in the disclosure.

Block 260 comprises generating formatted output data configured to cause the output device to display the determined output. The format of the output data will vary depending on the output device. For example, for a single-color LED array, the output data may simply be an array of bits, where each bit indicates whether an associated LED indicator is lit. For a tri-color LED indicator, the output data may be a series of three-bit arrays signifying, for each color in the LED indicator, whether the color should be lit. For an LCD screen, as yet another example, the output data may be a bitmap or even video data. Other examples of formatted output data are given elsewhere in the disclosure.

Block 270 comprises sending the formatted output data to the output device, typically via one or more connections between the message decoder and the output device. Block 275 comprises the output device receiving the formatted output data. Block 280 comprises the output device displaying the output based on the formatted output data. Techniques for output devices to receive, interpret, and display data formatted for the output device are known and will vary depending on the output device.

Flow 200 illustrates only one of many possible flows for displaying status indicators related to the performance of a switching subsystem or other status-reporting subsystem. Other flows may include fewer, additional, or different elements, in varying arrangements. For example, in some embodiments, blocks 250-280 may be replaced by steps for generating an output suitable for sending to a processor, microprocessor, or other electronic component via a PCIe or Ethernet interface. Such a target output component need not necessarily display any information, but may rather perform other actions based on the data.

4.0. EXAMPLE STATUS REPORTING SUBSYSTEM

Figure 3:
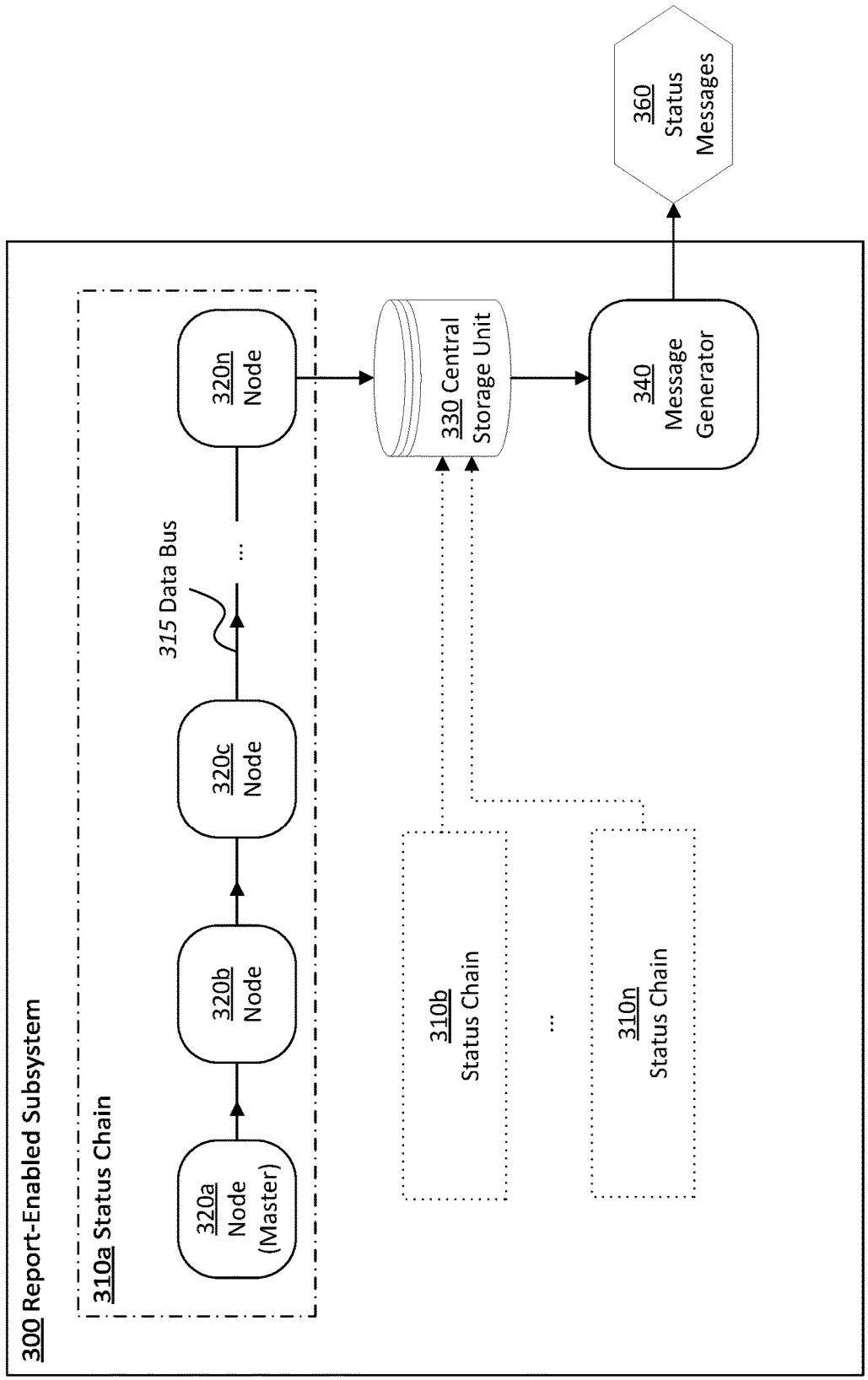
FIG. 3 illustrates an example status reporting subsystem.

FIG. 3 illustrates an example status reporting subsystem 300, according to an embodiment. Status reporting subsystem 300 may be any subsystem of a computing device configured to generate status messages, such as status messages 160 of FIG. 1. Status reporting subsystem 300 is implemented by hardware within an integrated circuit (e.g. logic gates, discrete wiring, etc.) or other specialized circuitry.

Status reporting subsystem 300 will typically have some primary function(s) other than status reporting, such as performing network functions, and thus include a number of other components (referred to as "primary components") configured to perform operations related to those primary function(s). These primary components will of course differ depending on the subsystem 300, and are thus not directly depicted in FIG. 3. The components depicted in FIG. 3, on the other hand, are ancillary to these primary function(s), and have instead been added to subsystem 300 to enable the collection and reporting of status information related to the operations of these primary components.

Status reporting subsystem 300 may thus be implemented in a variety of different computing subsystems, serving a variety of different primary functions, to report a variety of different status information. For example, in an embodiment, the depicted components of status reporting subsystem 300 may be used to implement the reporting component of switching subsystem 120. In yet other embodiments, status reporting subsystem 300 may be implemented within subsystems other than switching subsystem 120, having primary function(s) other than network-related functions.

Moreover, it will be understood that status reporting subsystem 300 is but one example mechanism by which a subsystem such as switching subsystem 120 may generate status messages 160. Other subsystems may have different elements, in varying arrangements. Thus, though there are additional advantages to utilizing the features of subsystem 300 to implement status reporting within the context of system 100, the features of system 100 do not specifically require the features of subsystem 300, and vice versa.

4.1. Status Chain

Subsystem 300 comprises one or more status chains 310a-n (collectively status chains 310). A status chain 310 is a functional block that is responsible for collecting status and/or configuration information from different components of subsystem 300. A status chain 310 includes a data bus 315, which in at least some embodiments is a discrete structure reserved exclusively for reporting status information and/or other functions that are ancillary to the primary function(s) of subsystem 300. The data bus 315 may comprise, for example, a combination of discrete wires and logic elements.

The data bus 315 interconnects and traverses through select components of subsystem 300. These selected components also referred to as nodes 320a-n (collectively nodes 320). Each node 320 comprises logic for collecting configuration and status information from or related to one or more primary components of subsystem 320. The node 320 may be coupled to, or embedded within, the primary components related to which they provide status information. For example, a node 320 may be coupled to a memory in which buffers and/or queues reside, and periodically collect and report information related to those buffers and/or queues. As another example, a node 320 may be coupled to a traffic manager or packet processor within a network device, and periodically poll that component for, or otherwise collect, status information related to its operations. As another example, nodes 320 may be coupled to each port or communication interface of a device.

A node 320 encodes the status information it has collected into an array (or other structure) of bits. Any suitable encoding scheme may be utilized. The number of bits used by a node 320 to encode the status and configuration information can be flexible and configured at the start of data transmission. Each node 320 places its array of bits on to the status chain 310 (i.e. by sending it along data bus 315).

The first node 320a on a status chain 310 is called the master node 320a. The master node 320a starts communications on the chain 310 at appointed times (e.g. every clock cycle, every other clock cycle, every n clock cycles, etc.) by placing an array of bits on the bus 315. This array of bits is then communicated to the next node 320b. Node 320b then optionally places its own array of bits on the bus 315 by appending to the bits received from the upstream node 320a, in a way that does not corrupt bits already on the bus 315. Node 320b then forwards the bits it received, and any additional bits it appended, to the next node 320c. This process repeats, with each node 320 forwarding that bits it received and any additional bits it appends to the next downstream node 320 until the last node 320n in the chain 310 is reached.

A node 320 may be active and append bits, or it may be passive and allow upstream bits to flow through the node 320 without appending any bits. For example, if the node 320 has not collected any status information since it last appended bits to the data bus 315, or at least not collected any status information that meets criteria for reporting, the node 320 may operate passively. At other times, the node 320 may switch to operating actively. Other nodes 320 may be configured to always append their respective bits to the data bus 315, even when their respective status information has not changed.

The status chain design does not place a limitation on the number of nodes 320 on the chain 310, although each embodiment of the chain is likely to have a specific number of nodes. Multiple chains 310 (e.g. optional chains 310b-n) may be implemented within the subsystem 300. Each chain 310 may report the same or different types of status information, depending on the embodiment. Status chains 310 may be physically independent, or share the same physical communication structure. If the same physical structure is used, the status information may be communicated via a singular protocol (e.g. time slotted protocol using a common message format), or using distinct protocols with some form of time sharing of the underlying physical resources.

4.2. Central Storage Unit

Data bus 315 of the status chain 310 terminates in a central storage unit 330 inside subsystem 300, which stores the status bits temporarily for processing. The central storage unit 330 may be configured to only store the latest status bits for each chain 310, or the central storage unit 330 may store a certain number of the most recently received status bits for each chain 310. Storage unit 330 may be any suitable type of memory of sufficient size to store the amount of status bits selected for storage. In an embodiment, the bits transported on the status chain are indexed into the storage unit 330 for faster access, processing, or transmission.

4.3. Message Generator

Subsystem 300 further comprises a message generator 340 configured to generate status messages 360 based on the status bits stored in the central storage unit 330. At predefined times (e.g. periodically or at other intervals), the message generator 340 reads the status bits stored inside the central storage unit 330, interprets the status bits as status information, and generates one or more messages 360 comprised of status fields whose values are calculated from the status bits. The messages 360 may, for example, have the same characteristics of messages 160, as described in other sections.

The message generator 340 then sends the messages 360 out of subsystem 300 (e.g. out a connection to a forwarding unit and/or one or more message decoders).

For example, consider an embodiment where one of the status chains 310 is an Ethernet status chain that enables the reporting of the status and configuration of each Ethernet interface in a switch device. The configuration and status of each interface may be precisely encoded using a series of bits. The central storage unit 330 stores all bits that are transported on the status chain per Ethernet interface, and updates the stored values using the most recent bits received on the chain 310. The status and configuration information reported for each Ethernet interface on the status chain may subsequently be read by the message generator 340, which then translates the bits into a collection of values for a set of attributes. These values may then be embedded into corresponding fields of one or more messages (e.g. in a packet format) and transmitted out of the device.

According to an embodiment, the message generator 340 may format different messages 360 in serially and send them out a single interface. Alternately, the messages 360 may be formed serially but transmitted in parallel from multiple interfaces. In another approach, multiple messages 360 may be generated in parallel to send serially out of a single interface, or in parallel from multiple interfaces.

4.4. Example Functional Implementation

Figure 4:
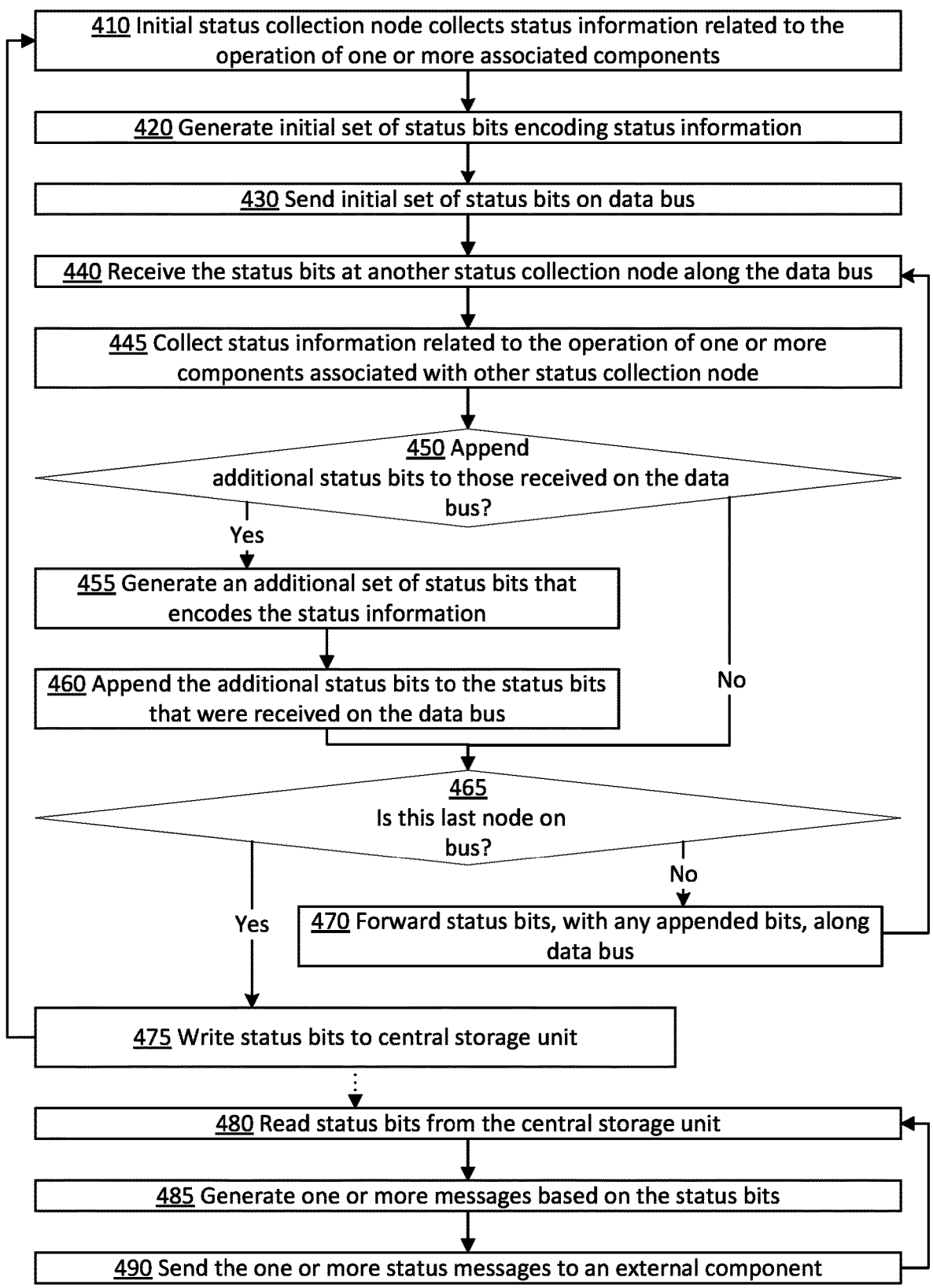
FIG. 4 illustrates an example flow for generating status messages related to the performance of a switching subsystem or other status-reporting subsystem.

FIG. 4 illustrates an example flow 400 for generating status messages related to the performance of a switching subsystem or other status-reporting subsystem, according to an embodiment. The various elements of flow 400 may be performed in a variety of systems, including systems such as system 300 described above. In an embodiment, each of the processes described in connection with the functional blocks described below may be implemented using one or more integrated circuits, logic components, computer programs, and/or other hardware or software elements in any of a general-purpose computer or a special-purpose computer. In an embodiment, flow 400 is one example of a technique for generating status messages per blocks 210 and 220 of FIG. 2, though flow 400 may be utilized in other contexts as well.

Block 410 comprises, at an initial status collection node of a subsystem, such as at master node 320a of subsystem 300, collecting status information related to the operation of one or more components associated with the initial status collection node. In an embodiment, the initial status node may be directly coupled to or embedded within the one or more components. The collecting may occur, for example, via a continual monitoring process of the one or more components, such as periodically reading configuration information or statistics from a memory, implementing a counting or other resource tracking mechanisms, polling the components for state information, and so forth.

Block 420 comprises generating an initial set of status bits. The initial set of status bits encodes status information related to one or more components. For example, the initial status collection node may be associated with a certain communication interface. The status information collected in block 410 may indicate that the device is in a "link active state" with a 1 Gbps link. The status collection node might encode this using any suitable representation, such as a single bit indicating whether the interface is in an active state, and a set of two bits to encode an enumerated value that represents 1 Gbps (assuming an enumeration scheme that enumerates only four possible speeds). Of course, many additional bits might be included to represent other enumerated states and statistics. In some embodiments, the status bits might be preceded by a node identifier and/or an identifier of the components being reported on.

Block 430 comprises sending the set of status bits on a data bus that is coupled to node, such as data bus 315. Blocks 420 and 430 may be performed at regular intervals (e.g. once every certain number of clock cycles), and/or in response to events (such as significant changes to the collected status information), depending on the embodiment. In an embodiment, blocks 420 and 430 are repeated at intervals at least as great as the amount of time or clock cycles needed for status bits to traverse the data bus and arrive in a central storage unit, as described subsequently. In other embodiments, blocks 420 and 430 may be repeated before the status bits of a previous iteration have arrived in a central storage unit. Block 410 may likewise be repeated at the same frequency, or block 410 may be performed asynchronously relative to blocks 420 and 430.

Block 440 comprises receiving the status bits at another status collection node along the data bus. Block 445 comprises, at this other status collection node, collecting status information related to the operation of one or more components associated with this other status collection node. Block 445 is performed in similar manner to block 410, but with respect to a different set of one or more components. For example, whereas the initial status collection node may have collected information for a first communication interface, the other status collection node may collect information for another interface. Or, the initial status collection node may have collected information related to a processor or configuration subsystem, while the other status collection node may have collected information related to one or more interfaces. As with the initial node, this other status collection node may be embedded within or coupled to the one or more components it monitors.

The monitoring processes that generate the status information collected in block 445 may monitor their respective one or more components concurrently with monitoring processes of other nodes, including the initial status collection node. The status information may be collected prior to, after, or at the same time as receiving the status bits in block 440. Block 445 may be performed synchronously or asynchronously relative to blocks 450-475.

Block 450 comprises determining whether to append additional status bits to those received on the data bus. The determining may comprise, for instance, determining whether recently collected status information in block 440 has changed in a significant manner. For example, configuration or operational state changes may be deemed significant, while minor changes in resource utilization metrics may be deemed insignificant. Of course, any other determination logic may be utilized to determine whether to append additional status bits.

If it is determined to append additional status bits, flow 400 proceeds to block 455, which comprises generating an additional set of status bits that encodes the status information collected in block 440. The set of status bits may be generated in similar manner to those of block 420. Block 460 comprises appending the additional status bits to the status bits that were received on the data bus. The term appending means simply adding the additional set of status bits to those already received, which may be done in any suitable manner. The additional set of status bits, or portions thereof, may be added before, after, and/or in between the received status bits. In at least one embodiment, instead of appending certain status bits, some of the existing status bits that were received on the data bus may be modified (e.g. adding to a count, computing a per-node average, etc.).

If, in block 450, it was determined not to append additional status bits to those received on the data bus, or upon conclusion of block 460, flow 400 proceeds to block 465. Block 465 comprises determining whether this status collection node is the last status collection node along the data bus. Such a determination is described merely for illustrating the process flow. The last status collection node in the data bus may simply be configured to proceed to block 475 without explicitly making such a determination, while other nodes may simply be configured to proceed to block 470.

Block 470 comprises forwarding the status bits received in block 440, with any appended additional set of status bits, along the data bus. From flow 470, flow 400 then returns to block 440, but with respect to the next status collection node along the data bus.

Block 475, on the other hand, comprises writing the status bits to a central storage unit, such as central storage unit 330. Writing the status bits may comprise overwriting other status bits in the central storage unit. The last status collection node along the bus may always overwrite the same bits, or implement some circular caching scheme where a certain number of recently received bits are kept, with the oldest status bits always overwritten.

Blocks 410-475 may repeat indefinitely. Moreover, blocks 410-475 may be performed by multiple sets of nodes concurrently. For example, there may be different status chains of nodes that send status bits concurrently.

Block 480 comprises reading the status bits from the central storage unit. A message generator or aggregation unit, such as message generator 340, may perform the reading at various intervals, either asynchronously relative to blocks 410-475, or directly in response to block 475. In an embodiment, block 480 may be performed with a lesser frequency than blocks 410-475.

Depending on the embodiment, only the most recent status bits may be read, or a certain history of status bits may be read. In an embodiment with multiple status chains, at any given instance of block 480, only the status bits generated by a certain status chain may be read (e.g. to generate a certain type of message that does not require status bits from other chains). In another such embodiment, all of the status bits are always read at the same time.

Block 485 comprises generating one or more messages based on the status bits read in block 480. Examples of techniques for generating status messages are described in other sections. Block 490 comprises sending the one or more status messages to an external component, such as a forwarding unit, message decoder, network interface, or any other external component, for further processing. Blocks 480-490 may repeat indefinitely.

Flow 400 illustrates only one of many possible flows for generating status messages related to the performance of a switching subsystem or other status-reporting subsystem. Other flows may include fewer, additional, or different elements, in varying arrangements. For example, block 460 may be omitted in certain embodiments, meaning that each node is configured to always append a set of status bits to the data bus.

5.0. EXAMPLE STATUS MESSAGES

The use of status messages, such as status messages 160 and 360, to convey information for use in displaying status indicators and other information, is now illustrated by way of examples of message types that may be utilized in a networking context. Status messages are not limited to only a networking context, and many other types of messages may exist.

Each of the example fields may, in at least one embodiment, directly correlate to a metric based upon whose value a message decoder may determine whether to light an LED indicator. In some embodiments, the determination to light an LED indicator may be made based on any metric calculated as a function of the values of two or more of the example fields. Other types of status messages and/or other arrangements of fields may be utilized in other embodiments. However, in network-related embodiments, the use of status indicators such as front-panel LED indicators or LCD displays to report many of the listed status attributes is not known, and hence the use of a system-mounted LED indicator or LCD display to convey certain individual attributes or combinations of attributes listed below is itself a unique and novel improvement beyond those already described.

Statistics reported by status messages may be obtained in any of a variety of manners, depending on the statistic and the implementing system.

5.1. Ethernet Status Message

Examples of fields found in an ethernet status message may include, without limitation, any or all of the following:

Message type: A field set to the type of the message, such as "Ethernet reporting," or an enumerated value corresponding thereto.

Interface Id: A unique identifier for the Ethernet interface that is being reported upon.

Link Speed: The speed of the Ethernet port which uses the Ethernet interface.

FEC Type: The type of Forward Error Correction code used.

Enabled: An indicator of whether the port that uses the interface is enabled.

Signal Detected: An indicator of whether a signal is detected at the receiver of the Ethernet interface.

Start Interface: Logically, the starting interface used by a port that uses multiple interfaces.

AutoNeg/Training: An indicator of whether there is auto-negotiation or link training active on the interface.

Link Up: The link status (up or down) of the Ethernet port that uses the interface.

Rx Link Active: An indicator of whether a packet was received over the interface in the previous measurement interval.

Tx Link Active: An indicator of whether a packet was transmitted over the interface in the previous measurement interval.

Local Fault: An indicator of whether the Ethernet port using the interface is in a Local Fault State.

Remote Fault: An indicator of whether the Ethernet port using the interface is in a Remote Fault State.

SerDes status: An indicator of whether the Serializer/Deserializer ("SerDes") block used by the interface is ready.

Parity: Odd or even parity over all other bits.

Drop rate: A rate of packet loss, or number of dropped packets, for the interface over a period of time. Alternatively, a field may indicate simply whether a packet was dropped since the least status message. Or, a separate type of status message may indicate a dropped packet.

5.2. Queue Status Message

Fields included in a queue status message may include, without limitation: a queue identifier, a queue congestion level for the identified queue, a queue length for the identified queue, a rate or number of queue-bound packets that were dropped since the last queue status message, and a queue delay for the identified queue. There may be separate message for each queue, or a single message that includes an array of the foregoing fields, with an entry for each queue. Variations of these statistics may include, for example, an average measure (e.g. average queue length over a recent period of time, average queue length across a set of queues, etc.), maximum measure (e.g. maximum queue delay over a recent period of time, maximum queue delay found in a set of queues, etc.), minimum measure, instantaneous measure, and so forth.

5.3. Buffer Status Message

Fields included in a buffer status message may include, without limitation: a buffer identifier, a buffer fill level for the identified buffer, a per-bank memory fill level, and an amount of buffer shared space available. Variations of these statistics may include an average measure (e.g. average buffer fill level over a recent period of time, average buffer fill level across a set of buffers, etc.), maximum measure (e.g. maximum buffer fill level over a recent period of time, maximum buffer fill level found in a set of buffers, etc.), minimum measure, instantaneous measure, and so forth.

5.4. Physical Status Message

Fields included in a power status message may include, without limitation: a power measure (e.g. peak, average, and/or instantaneous), or a temperature measure (e.g. peak, average, and/or instantaneous). Power and temperature measures may be reported on a device basis, or on a per measurement node basis, so as to report different measures across different physical locations.

5.5. Port Status Message

Fields included in a power status message may include, without limitation: a transmission rate, a reception rate, a port loading indicator, a port congestion level, a port delay (e.g. average, minimum, or maximum), or a port use count (e.g. a number of buffers used by the port, as an average, minimum, maximum, instantaneous, etc.).

5.6. Control Path Status Message

Fields included in a control path message may include, without limitation: a table utilization measure, an indicator for a table fault, an indicator for a table insertion failure, or an indicator for a table lookup failure.

5.7. Interrupt/Debug Status Message

An interrupt or debugging status message may include various indicators for various interrupts or error states, such as for an ECC read failure, a lookup failure, a device error, and so forth.

6.0. EXAMPLE EMBODIMENTS

Examples of some embodiments are represented, without limitation, in the following clauses:

According to an embodiment, a system comprises: a subsystem configured to perform operations, the subsystem further comprising a reporting component configured to collect status information with respect to the operations and generate status messages based thereon; and a message decoder configured to receive at least particular status messages generated by the reporting component, the message decoder further configured to determine outputs to display based on the particular status messages, and to send formatted output data to an output device, the formatted output data configured to cause the output device to display the outputs.

According to an embodiment, an apparatus comprises: a first interface configured to be connected to an output device; a second interface configured to be connected to another subsystem; message reception logic configured to receive status messages over the second interface, the status messages reporting status information with respect to operations of the other subsystem; message decoding logic configured to determine outputs to display at the output device based on the status messages; and display driving logic configured to send formatted output data to the output device, the formatted output data configured to cause the output device to display the output.

According to an embodiment, an apparatus comprises: a first interface configured to be connected to a light-emitting diode ("LED") array comprising a plurality of LED indicators; a second interface configured to be connected to a network switching subsystem configured to perform network operations with respect to network traffic communicated over a plurality of network interfaces; message reception logic configured to receive status messages over the second interface, the status messages reporting status information with respect to the network switching subsystem; message decoding logic configured to determine one or more manners in which to light particular LED indicators of the LED array based on the status messages; and display driving logic configured to, at determined times, send formatted output data to the LED array configured to cause the particular LED indicators of the LED array to light in the determined one or more manners.

According to an embodiment, a system comprises: a plurality of network interfaces; a network switching subsystem configured to perform network operations with respect to network traffic communicated over the plurality of network interfaces, the switching subsystem comprising a reporting component configured to collect status information with respect to the network switching subsystem and generate status messages based thereon; and a message decoder coupled to the network switching subsystem and configured to receive at least particular status messages generated by the reporting component, the message decoder further configured to determine one or more manners in which to light particular light-emitting diode ("LED") indicators of an LED array based on the particular status messages, and to send formatted output data to the LED array configured to cause the particular LED indicators of the LED array to light in the determined one or more manners.

In an embodiment, each of the one or more manners corresponds to a particular behavior, state, or event indicated by the one or more of the status messages.

In an embodiment, the one or more of manners include at least one of: whether to light one or more of the particular LED indicators, one or more colors to light the particular LED indicators, one or more intensities with which to light the particular LED indicators, a flicker rate for the particular LED indicators, a pattern for the particular LED indicators, and/or color transitions for the particular LED indicators.

In an embodiment, the subsystem and the message decoder are separate integrated circuits.

In an embodiment, the message decoder is a programmable logic device.

In an embodiment, two or more of the plurality of LED indicators correspond to fields of the status messages, including two or more of: a link status, an activity indicator, a link speed, a signal detection indicator, an interface enabled indicator, or a fault state indicator.

In an embodiment, the status messages include different types of status messages with different types of status information, including a physical status message type with power and/or temperature information corresponding to a first set of one or more LED indicators, and an interface status message type with interface status information corresponding to a second set of one or more LED indicators.

In an embodiment, the status messages include at least one of queue status information or buffer status information, and the LED array includes one or more LED indicators corresponding to at least one of the queue status information or the buffer status information.

In an embodiment, the status messages include at least one field whose value corresponds to a system performance metric, wherein determining when to light particular LED indicators comprises comparing one or more thresholds associated with a first LED indicator to the value.

In an embodiment, the system and/or apparatus further comprise the LED array.

In an embodiment, the LED array includes a controller configured to send electrical current to specific LED indicators specified by the formatted output data, the electrical current causing the specific LED indicators to emit light for a period of time.

In an embodiment, the status messages are generated in a common format that is independent of a configuration of the LED array, and the formatted output data is formatted in a custom format that is specific to the configuration of the LED array.

In an embodiment, the common format is an extensible packet format.

In an embodiment, the system and/or apparatus further comprise multiple output devices, including the LED array.

In an embodiment, the message decoder, or a second message decoder configured to receive at least second status messages from the network switching subsystem, is further configured to determine second outputs of a second output device based on the second status messages, and to send second formatted output data to the second output device configured to cause the second output device to display the second outputs.

In an embodiment, the second output device is an aggregating unit configured to display status information from multiple network switching subsystems.

In an embodiment, the multiple network switching subsystems are in different rack-mounted network devices, and the aggregating unit is a separate apparatus mounted in vicinity to the rack-mounted network devices.

In an embodiment, the aggregating unit is a handheld device that communicates wirelessly with the network switching subsystem and/or the message decoder.

In an embodiment, the system and/or apparatus further comprise a forwarding unit configured to forward at least some of the generated status messages to an external processor or microcontroller configured to perform one or more actions based on the forwarded status messages.

In an embodiment, the network switching subsystem sends the status messages to the message decoder via a central processor unit.

In an embodiment, the reporting component comprises: a discrete data bus for reporting status information; a plurality of nodes coupled to the discrete data bus, the plurality of nodes configured to collect status information for components to which they are connected or in which they are embedded, the plurality of nodes further configured to encode that status information and place the encoded status information on the data bus; and a message generator configured to generate the status messages based on the encoded status information.

According to an embodiment, a method comprises: collecting status information with respect to operations of a subsystem; generating a status message based on the collected status information; receiving the status message at a message decoder; based on at least one field of data in the status message, the message decoder determining an output to display at an output device based on the status messages; sending, from the message decoder to the output device, formatted output data configured to cause the output device to display the output.

According to an embodiment, a method comprises: receiving a status message at a message decoder, the status message reflecting status information collected with respect to network operations of a network switching subsystem; based on at least one field of data in the status message, the message decoder determining an LED indicator of the LED array to light, the LED indicator corresponding to a status indicated by the status message; sending, from the message decoder to the LED array, formatted output data configured to cause at least the LED indicator to light.

According to an embodiment, a method comprises: collecting status information with respect to network operations of a network switching subsystem, the network switching subsystem configured to perform the network operations with respect to network traffic communicated over a plurality of network interfaces; generating a status message based on the collected status information; receiving the status message at a message decoder; based on at least one field of data in the status message, the message decoder determining an LED indicator of the LED array to light, the LED indicator corresponding to a state indicated by the status message; sending, from the message decoder to the LED array, formatted output data configured to cause at least the LED indicator to light.

In an embodiment, the method further comprises determining how to light the LED indicator, the formatted output data specifying to the LED array how to light the LED indicator, the manner in which the LED indicator is determined to be lit corresponding to a behavior, state, or event indicated by the status message, wherein determining how to light the LED indicator includes one or more of: determining one or more colors to light the LED indicator, determining an intensity with which to light the LED indicator, determining a flicker rate for the LED indicator, determining a pattern for the LED indicator, and/or determining a color transitions for the LED indicator.

In an embodiment, the subsystem and the message decoder are separate integrated circuits.

In an embodiment, the LED indicator corresponds to one of: a link status, an activity indicator, a link speed, a signal detection indicator, an interface enabled indicator, or a fault state indicator.

In an embodiment, the LED indicator corresponds to one of queue status information or buffer status information.

In an embodiment, the method further comprises, at a controller of the LED array, based on the formatted output data received from the message decoder, sending an electrical current to the LED indicator that causes the LED indicator to emit light for a period of time.

In an embodiment, the status message is generated in a common format that is independent of a configuration of the LED array, wherein the formatted output data is formatted in a custom format that is specific to the configuration of the LED array.

In an embodiment, the method further comprises: receiving, at the message decoder or a second message decoder, a second status message from the network switching subsystem; determining a second output of a second output device based on the second status message; and sending second formatted output data to the second output device configured to cause the second output device to display the second output.

In an embodiment, the method further comprises forwarding a second status message from the network switching subsystem to an external processor or microcontroller configured to perform one or more actions based on the second status message.

In an embodiment, the method further comprises generating the status message at the network switching subsystem by: collecting particular status information at each of a plurality of nodes within the network switching subsystem, each of the plurality of nodes coupled to or embedded within one or more components to which the particular status information pertains; at each of the plurality of nodes, encoding the particular status information; placing the encoded status information on a discrete status bus coupled to each of the plurality of nodes; and at a message generator of the network switching subsystem, generating the status message based on the encoded status information.

According to an embodiment, a method of manufacturing a network device comprises: connecting a network switching circuit to a message decoding circuit; wherein the network switching circuit is configured to perform network operations with respect to network traffic communicated over a plurality of network interfaces, the switching subsystem comprising a reporting component configured to collect status information with respect to the network switching subsystem and generate status messages based thereon; wherein the message decoding circuit is a programmable logic device; connecting the message decoding circuit to an LED array, the LED array comprising an LED matrix driver and a plurality of LED indicators; programming the message decoding circuit to determine one or more manners in which to light particular LED indicators of the LED array based on particular status messages received from the network switching circuit, and to generate formatted output data configured to instruct the LED matrix driver to light the one or more LED indicators based on the determining.

In an embodiment, the message decoding circuit is pre-programmed with logic to generate generic formatted output data that lights certain LED indicators in response to certain status messages, wherein programming the message decoding circuit comprises reprogramming the message decoding circuit to generate formatted output data in a format that is specific to the LED matrix driver and/or to determine additional times, not indicated by the pre-programmed logic, to light one or more LED indicators based on the particular status messages.

According to an embodiment, an apparatus comprises: a plurality of components configured to perform operations; a discrete data bus for reporting status information; a chain of nodes coupled to the discrete data bus, each node of the chain of nodes coupled to or embedded within one or more of the components, and configured to collect status information for the one or more of the components, each node further configured to encode the collected status information and place the encoded status information on the data bus; and a message generator configured to generate status messages based on the encoded status information, and to send the status messages outside of the apparatus.

According to an embodiment, an apparatus comprises a plurality of components collectively configured to perform network operations with respect to network traffic communicated over a plurality of network interfaces; a discrete data bus for reporting status information; a chain of nodes coupled to the discrete data bus, each node of the chain of nodes coupled to or embedded within one or more of the components, and configured to collect status information for the one or more of the components, each node further configured to encode the collected status information and place the encoded status information on the data bus; a message generator configured to generate status messages based on the encoded status information, and to send the status messages outside of the apparatus.

In an embodiment, the encoded status information is a series of bits.

In an embodiment, the apparatus further comprises: a central storage unit at the end of the data bus configured to store the encoded status information from the plurality of nodes; wherein the message generator is configured to read the encoded status information from the central storage unit.

In an embodiment, the chain of nodes is an ordered chain; wherein, at intervals, a master node of the chain of nodes, deployed at the beginning of the chain, is configured to initiate collection of status information for the chain by sending first encoded status information to a second node of the chain along the data bus; wherein each subsequent node in the chain, after the master node, is configured to receive encoded status information from a previous node in the chain and append additional encoded status information to the received encoded status information; wherein each node other than a last node in the chain is configured to forward the received encoded status information, with any encoded status information appended by the node, to a next node in the chain; wherein the last node in the chain is configured to write the received encoded status information, with any encoded status information appended by the last node, to the central storage unit.

In an embodiment, at least one node configured to append additional encoded status information is configured to append that additional status information only under certain conditions, and to forward the received encoded status information to the next node without appending additional encoded status information under other conditions.

In an embodiment, the status messages include fields for two or more of: a link status, an activity indicator, a link speed, a signal detection indicator, an interface enabled indicator, or a fault state indicator.

In an embodiment, the status messages include different types of status messages reflecting different types of status information indicated by the encoded status information, the different types including a physical status message type with power and/or temperature information, and an interface status message type with interface status information.

In an embodiment, the status message includes at least one of queue status information or buffer status information.

In an embodiment, the apparatus is an integrated circuit configured to be coupled to a separate integrated circuit configured to execute message decoding logic that controls an LED array.

In an embodiment, components for which status information is collected include one or more of: a traffic manager, a packet processor, a memory storing packet buffers, a network interface, or a serializer/deserializer.

In an embodiment, the apparatus further comprises a plurality of chains of nodes, each configured to collect status information from a different set of components from the plurality of components, the message decoder configured to generate status messages for encoded status information generated from each of the chains.

According to an embodiment, a method comprises: at a network switching subsystem comprising a plurality of components, performing network operations with respect to network traffic communicated over a plurality of network interfaces; collecting particular status information at each of a plurality of nodes within the network switching subsystem, each node of the plurality of nodes coupled to or embedded within one or more of the components, the status information collected by the node pertaining to the one or more of the components; at each of the plurality of nodes, encoding the particular status information; placing the encoded status information on a discrete data bus coupled to each of the plurality of nodes; at a message generator of the network switching subsystem, generating the status message based on the encoded status information; and sending the status messages outside of the network switching subsystem.

In an embodiment, the method further comprises: storing the encoded status information from the plurality of nodes in a central storage unit at the end of the data bus; and reading, by the message generator, the encoded status information from the central storage unit.

In an embodiment, the chain of nodes is an ordered chain, and the method further comprises: at intervals, a master node of the chain of node, deployed at the beginning of the chain, initiating collection of status information for the chain by sending first encoded status information to a second node of the chain along the data bus; at each subsequent node in the chain, after the master node, receiving encoded status information from a previous node in the chain and appending additional encoded status information to the received encoded status information; at each node other than a last node in the chain, forwarding the received encoded status information, with any encoded status information appended by the node, to a next node in the chain; and at the last node in the chain, writing the received encoded status information, with any encoded status information appended by the last node, to the central storage unit.

In an embodiment, at least one node configured to append additional encoded status information is configured to append that additional status information only under certain conditions, and to forward the received encoded status information to the next node without appending encoded status information under other conditions.

In an embodiment, the status messages include fields for two or more of: a link status, an activity indicator, a link speed, a signal detection indicator, an interface enabled indicator, or a fault state indicator.

In an embodiment, the status messages include different types of status messages reflecting different types of status information indicated by the encoded status information, the different types including a physical status message type with power and/or temperature information, and an interface status message type with interface status information.

In an embodiment, the status messages include at least one of queue status information or buffer status information.

In an embodiment, the network switching subsystem is an integrated circuit configured to be coupled to a separate integrated circuit configured to execute message decoding logic that controls an LED array.

In an embodiment, components for which status information is collected include one or more of: a traffic manager, a packet processor, a memory storing packet buffers, a network interface, or a serializer/deserializer.

In an embodiment, the method further comprises generating encoded status information at each of a plurality of chains of nodes, each configured to collect status information from a different set of components from the plurality of components, the message decoder configured to generate status messages for the encoded status information generated by each of the chains.

Other examples of these and other embodiments are found throughout this disclosure.

7.0. IMPLEMENTATION MECHANISM—HARDWARE OVERVIEW

According to one embodiment, the techniques described herein are implemented by one or more special-purpose computing devices. The special-purpose computing devices may be desktop computer systems, portable computer systems, handheld devices, networking devices, or any other device that incorporates hard-wired and/or program logic to implement the techniques. The special-purpose computing devices may be hard-wired to perform the techniques, or may include digital electronic devices such as one or more application-specific integrated circuits (ASICs) or field programmable gate arrays (FPGAs) that are persistently programmed to perform the techniques. Such special-purpose computing devices may also combine custom hard-wired logic, ASICs, FPGAs, or other circuitry with custom programming to accomplish the techniques.

Though certain foregoing techniques are described with respect to hardware implementations, which provide a number of advantages in certain embodiments, it will also be recognized that, in other embodiments, the foregoing techniques may still provide certain advantages when performed partially or wholly in software. Accordingly, in such an embodiment, a suitable implementing apparatus comprises a general-purpose hardware processor and is configured to perform any of the foregoing methods by executing program instructions in firmware, memory, other storage, or a combination thereof.

7.1. Example Network

A computer network is a set of computing components interconnected by communication links. Each computing component may be a separate computing device, such as, without limitation, a hub, switch, bridge, router, server, gateway, or personal computer, or a component thereof. Each computing component, or "network device," is considered to be a node within the network. A communication link is a mechanism of connecting at least two nodes such that each node may transmit data to and receive data from the other node. Such data may be transmitted in the form of signals over transmission media such as, without limitation, electrical cables, optical cables, or wireless media.

The structure and transmission of data between nodes is governed by a number of different protocols. There may be multiple layers of protocols, typically beginning with a lowest layer, such as a "physical" layer that governs the transmission and reception of raw bit streams as signals over a transmission medium. Each layer defines a data unit (the protocol data unit, or "PDU"), with multiple data units at one layer combining to form a single data unit in another. Additional examples of layers may include, for instance, a data link layer in which bits defined by a physical layer are combined to form a frame or cell, a network layer in which frames or cells defined by the data link layer are combined to form a packet, and a transport layer in which packets defined by the network layer are combined to form a TCP segment or UDP datagram. The Open Systems Interconnection model of communications describes these and other layers of communications. However, other models defining other ways of layering information may also be used. The Internet protocol suite, or "TCP/IP stack," is one example of a common group of protocols that may be used together over multiple layers to communicate information. However, techniques described herein may have application to other protocols outside of the TCP/IP stack.

A given node in a network may not necessarily have a link to each other node in the network, particularly in more complex networks. For example, in wired networks, each node may only have a limited number of physical ports into which cables may be plugged in to create links. Certain "terminal" nodes—often servers or end-user devices—may only have one or a handful of ports. Other nodes, such as switches, hubs, or routers, may have a great deal more ports, and typically are used to relay information between the terminal nodes. The arrangement of nodes and links in a network is said to be the topology of the network, and is typically visualized as a network graph or tree.

A given node in the network may communicate with another node in the network by sending data units along one or more different "paths" through the network that lead to the other node, each path including any number of intermediate nodes. The transmission of data across a computing network typically involves sending units of data, such as packets, cells, or frames, along paths through intermediary networking devices, such as switches or routers, that direct or redirect each data unit towards a corresponding destination.

While a data unit is passing through an intermediary networking device—a period of time that is conceptualized as a "visit" or "hop"—the device may perform any of a variety of actions, or processing steps, with the data unit. The exact set of actions taken will depend on a variety of characteristics of the data unit, such as metadata found in the header of the data unit, and in many cases the context or state of the network device. For example, address information specified by or otherwise associated with the data unit, such as a source address, destination address, or path information, is typically used to determine how to handle a data unit (i.e. what actions to take with respect to the data unit). For instance, an Internet Protocol ("IP") data packet may include a destination IP address field within the header of the IP data packet, based upon which a network router may determine one or more other networking devices, among a number of possible other networking devices, to forward the IP data packet to.

Figure 5:
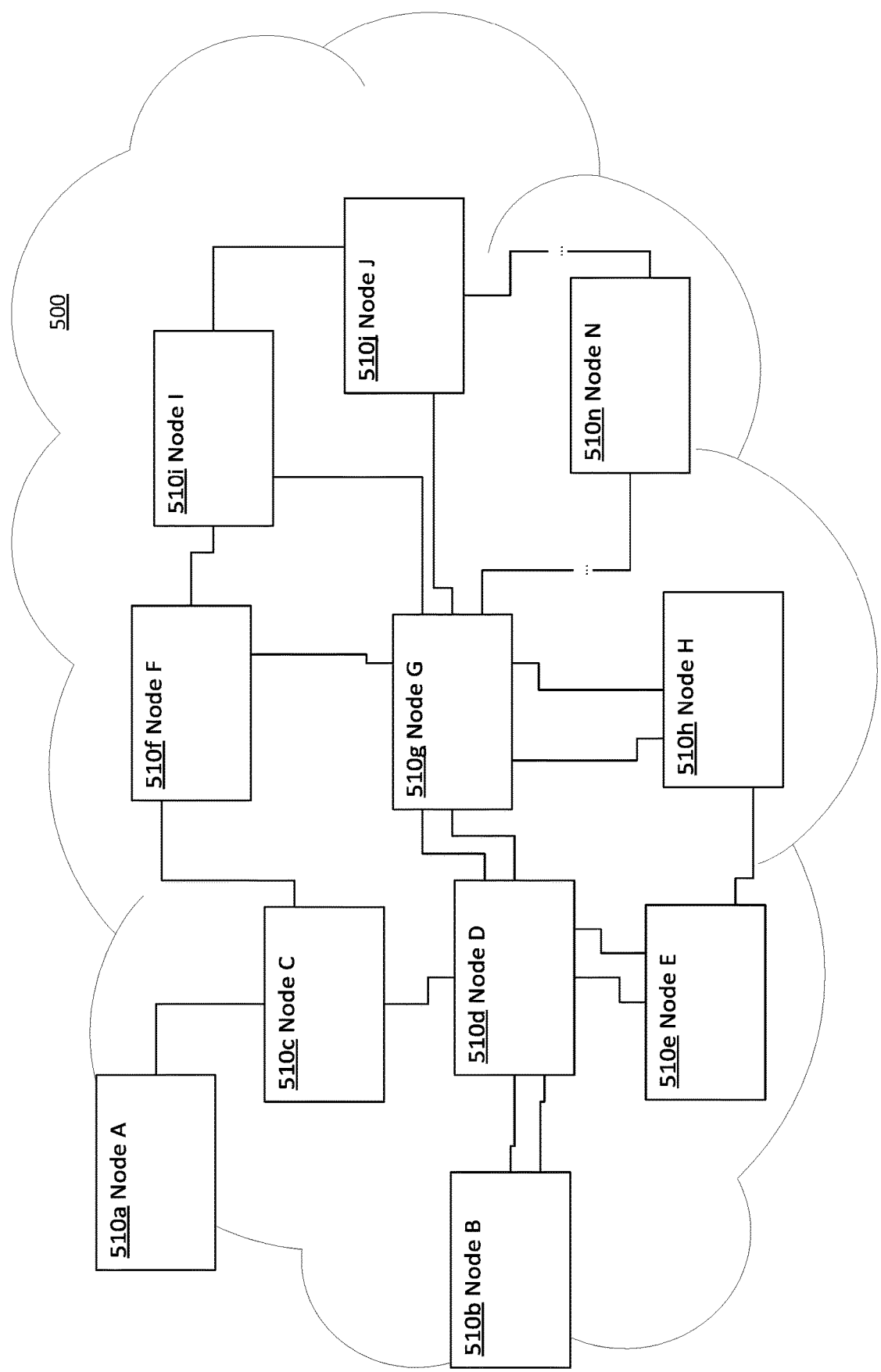
FIG. 5 is an illustrative view of various aspects of an example networking system, also referred to as a network, in which the techniques described herein may be practiced.

FIG. 5 is an illustrative view of various aspects of an example networking system 500, also referred to as a network, in which the techniques described herein may be practiced, according to an embodiment. Networking system 500 comprises a plurality of interconnected nodes 510*a*-510*n* (collectively nodes 510), each implemented by a different computing device. For example, a network node 510 may be a single networking computing device, such as a router or switch, in which some or all of the processing components described herein are implemented using application-specific integrated circuits (ASICs) or field programmable gate arrays (FPGAs). As another example, a network node 510 may include one or more memories storing instructions for implementing various components described herein, one or more hardware processors configured to execute the instructions stored in the one or more memories, and various data repositories in the one or more memories for storing data structures utilized and manipulated by the various components.

Each network node 510 is connected to one or more other network nodes 510 in network 500 by one or more communication links, depicted as lines between network nodes 510. The communication links may be any suitable wired cabling or wireless links. Note that system 500 illustrates only one of many possible arrangements of nodes within a network. Other networks may include fewer or additional network nodes 510 having any number of links between them.

Network Packets

While each network node 510 may or may not have a variety of other functions, in an embodiment, each network node 510 is configured to send, receive, and/or relay data to one or more other network nodes 510 via these links. In general, data is communicated as series of discrete units or structures of data represented by signals transmitted over the communication links.

Different network nodes 510 within a network 500 may send, receive, and/or relay data units at different communication levels, or layers. For instance, a first network node 510 may send a data unit at the network layer (e.g. a TCP segment) to a second network node 510 over a path that includes an intermediate network node 510. This data unit 510 will be broken into smaller data units ("subunits") at various sublevels before it is transmitted from the first network node 510. For example, the data unit may be broken into packets, then cells, and eventually sent out as a collection of signal-encoded bits to the intermediate device. Depending on the network type and/or the device type of the intermediate network node 510, the intermediate network node 510 may rebuild the entire original data unit before routing the information to the second network node 510, or the intermediate network node 510 may simply rebuild the subunits (e.g. packets or frames) and route those subunits to the second network node 510 without ever composing the entire original data unit.

When a network node 510 receives a data unit, it typically examines addressing information within the data unit (and/or other information within the data unit) to determine how to process the data unit. The addressing information may be, for instance, an Internet Protocol (IP) address, MPLS label, or any other suitable information. If the addressing information indicates that the receiving network node 510 is not the destination for the data unit, the node may look up the destination network node 510 within receiving node's routing information and route the data unit to another network node 510 connected to the receiving network node 510 based on forwarding instructions associated with the destination network node 510 (or an address group to which the destination node belongs). The forwarding instructions may indicate, for instance, an outgoing port over which to send the packet, a label to attach the packet, etc. In cases where multiple paths to the destination network node 510 are possible, the forwarding instructions may include information indicating a suitable approach for selecting one of those paths, or a path deemed to be the best path may already be defined.

Addressing information, flags, labels, and other metadata used for determining how to handle a data unit is typically embedded within a portion of the data unit known as the header. The header is typically at the beginning of the data unit, and is followed by the payload of the data unit, which is the information actually being sent in the data unit. A header is typically comprised of fields of different types, such as a destination address field, source address field, destination port field, source port field, and so forth. In some protocols, the number and the arrangement of fields may be fixed. Other protocols allow for arbitrary numbers of fields, with some or all of the fields being preceded by type information that explains to a node the meaning of the field.

A traffic flow is a sequence of data units, such as packets, from a source computer to a destination. In an embodiment, the source of the traffic flow may mark each data unit in the sequence as a member of the flow using a label, tag, or other suitable identifier within the data unit. In another embodiment, the flow is identified by deriving an identifier from other fields in the data unit (e.g. a "five-tuple" combination of a source address, source port, destination address, destination port, and protocol). A flow is often intended to be sent in sequence, and network devices are therefore typically configured to send all data units within a given flow along a same path to ensure that the flow is received in sequence.

For convenience, many of the techniques described in this disclosure are described with respect to routing IP packets in an L3 (level 3) network, in which context the described techniques have particular advantages. It will be recognized, however, that these techniques may also be applied to realize advantages in routing other types of data units conforming to other protocols and/or at other communication layers within a network. Thus, unless otherwise stated or apparent, the term "packet" as used herein should be understood to refer to any type of data structure communicated across a network, including packets as well as segments, cells, data frames, datagrams, and so forth.

Network Paths

Any node in the depicted network 500 may communicate with any other node in the network 500 by sending packets through a series of network nodes 510 and links, referred to as a path. For example, Node B (510*b*) may send packets to Node H (510*h*) via a path from Node B to Node D to Node E to Node H. There may be a large number of valid paths between two nodes. For example, another path from Node B to Node H is from Node B to Node D to Node G to Node H.

In an embodiment, a network node 510 does not actually need to specify a full path for a packet that it sends. Rather, the network node 510 may simply be configured to calculate the best path for the packet out of the device (e.g. which egress port it should send the packet out on). When a network node 510 receives a packet that is not addressed directly to the network node 510, based on header information associated with a packet, such as path and/or destination information, the network node 510 relays the packet along to either the destination network node 510, or a "next hop" network node 510 that the network node 510 calculates is in a better position to relay the packet to the destination network node 510. In this manner, the actual path of a packet is product of each network node 510 along the path making routing decisions about how best to move the packet along to the destination network node 510 identified by the packet.

7.2. Example Network Device

Figure 6:
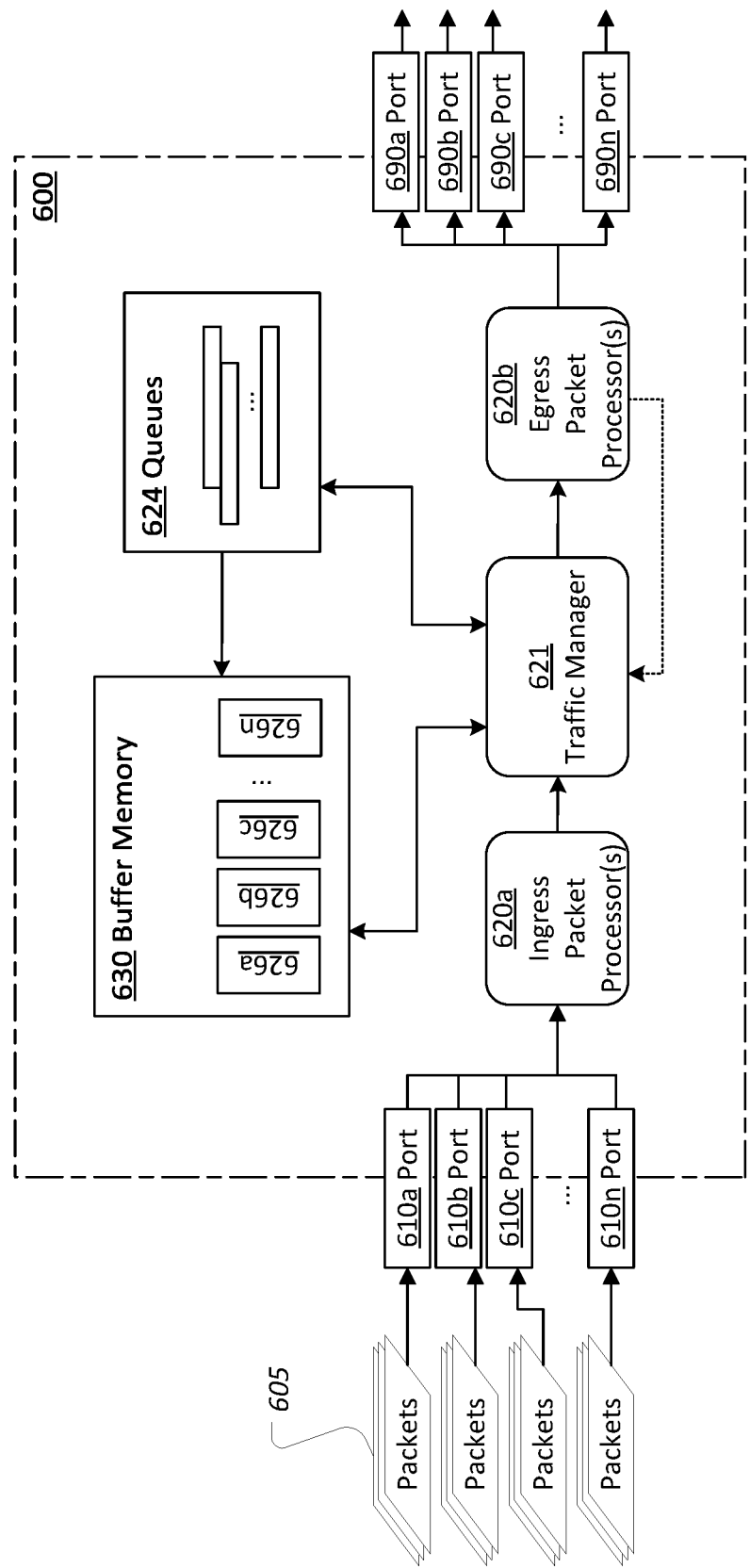
FIG. 6 is an illustrative view of various aspects of an example network device in which techniques described herein may be practiced.

FIG. 6 is an illustrative view of various aspects of an example network device 600 in which techniques described herein may be practiced, according to an embodiment. Network device 600 is a computing device comprising any combination of hardware and software configured to implement the various logical components described herein, including components 610-690. For example, a network device 600 may be a single networking computing device, such as a router or switch, in which some or all of the processing components described herein are implemented using application-specific integrated circuits (ASICs) or field programmable gate arrays (FPGAs). As another example, a network device 600 may include one or more memories storing instructions for implementing various components described herein, one or more hardware processors configured to execute the instructions stored in the one or more memories, and various data repositories in the one or more memories for storing data structures utilized and manipulated by the various components.

In an embodiment, system 100 may be a network device 600, with switching subsystem 120 being a specialized chip within the network device configured to implement, among other aspects, components 620-630. Similarly, in an embodiment, subsystem 300 may be implemented in a network device 600, with each of the nodes 320 implemented at various internal ports, processors, or other components of the network device 600.

Ports

Network device 600 includes ports 610/690. Ports 610, including ports 610a-n, are inbound ("ingress") ports by which data units referred to herein as packets 605 are received over a network, such as network 500. Ports 690, including ports 690a-n, are outbound ("egress") ports by which at least some of the packets 605 are sent out to other destinations within the network, after having been processed by the network device 600.

Ports 610/690 are depicted as separate ports for illustrative purposes, but may actually correspond to the same physical hardware ports (i.e. network jacks or "interfaces") on the network device 610. That is, a network device 600 may both receive packets 605 and send packets 605 over a single physical port, and the single physical port may thus function as both an ingress port 610 and egress port 690. Nonetheless, for various functional purposes, certain logic of the network device 600 may view a single physical port as a separate ingress port 610 and egress port 690. Moreover, for various functional purposes, certain logic of the network device 600 may subdivide a single ingress port 610 or egress port 690 into multiple ingress ports 610 or egress ports 690, or aggregate multiple ingress ports 610 or multiple egress ports 690 into a single ingress port 610 or egress port 690. Hence, in various embodiments, ports 610 and 690 should be understood as distinct logical constructs that are mapped to physical ports rather than simply as distinct physical constructs.

In some embodiments, the ports 610/690 of a device 600 may be coupled to one or more transceivers, such as Serializer/Deserializer ("SerDes") blocks. For instance, ports 610 may provide parallel inputs of received data units into a SerDes block, which then outputs the data units serially into an ingress packet processor 620a. On the other end, an egress packet processor 620b may input data units serially into another SerDes block, which outputs the data units in parallel to ports 690.

Packet Processors

A device 600 comprises one or more packet processing components 620, such as the depicted ingress processor 620a and egress packet processor 620b, that collectively implement forwarding logic by which the device 600 is configured to determine how to handle each packet the device 600 receives. These packet processors 620 may be any suitable combination of fixed circuitry and/or software-based logic, such as specific logic components implemented by one or more Field Programmable Gate Arrays (FPGAs) or Application-Specific Integrated Circuits (ASICs), or a general purpose processor executing software instructions.

Different packet processors 620 may be configured to perform different packet processing tasks. For instance, some packet processors may forward packets 605 out egress ports 690, other packet processors 620 may implement flow control mechanisms, other packet processors 620 may perform statistical collection or debugging tasks, and so forth. A device 600 may comprise any number of packet processors 620 configured to perform any number of processing tasks.

In an embodiment, the packet processors 620 of a device 600 are arranged such that the output of one packet processor is, eventually, input into another processor 620, in such a manner as to pass packets 605 from certain packet processor(s) 620 to other packet processor(s) 620 in a sequence of stages, until finally disposing of the packets 605 (e.g. by sending the out an egress port 690, "dropping" the packets 605, etc.). The exact set and/or sequence of packet processors 620 that process a given packet 620 may vary, in some embodiments, depending on the attributes of the packet 620 and/or the state of the device 600.

Ingress and Egress Processors

In an embodiment, a packet processor 620 may be generally classified as an ingress packet processor 620a or an egress packet processor 620b. Generally speaking, an ingress packet processor 620a performs certain routine intake tasks on packets 605 as they arrive. These intake tasks are typically relatively minor, such as categorically blocking packets 605 with certain attributes and/or when the device 600 is in a certain state, duplicating certain types of packets, making initial categorizations of packets, and so forth. These intake tasks are generally tasks that can be performed relatively quickly, so as to not require buffering of the packets 605. In an embodiment, there may be fewer ingress packet processors 620a relative to egress packet processor(s) 620b, or even just one ingress packet processor 620a.

The egress packet processor(s) 620b of a device 600, by contrast, are configured to perform all non-intake tasks necessary to implement the forwarding logic of the device 600. These tasks may include, for example, tasks such as identifying paths along which to forward the packets, implementing flow control and/or other policies, manipulating packets, performing statistical or debugging operations, and so forth. These tasks may be more complex than the intake tasks, and may in many cases require some sort of buffering in order to handle large volumes of traffic. In an embodiment, there may be different egress packet processors(s) 620b assigned to different flows or other categories of traffic, such that not all packets 605 will be processed by the same egress packet processor 620b.

In an embodiment, multiple egress packet processor(s) 620b may be chained together such that a packet 605 processed by a first egress packet processor 620b is later processed by a second egress packet processor 620b configured to send the packet 605 out a specific port 690. There is no limit to the number of packet processor(s) 620*b* within such a chain.

Forwarding Logic and Tables

As mentioned, the packet processors 620 collectively implement the forwarding logic of a device 600. The forwarding logic of a device 600, or portions thereof, may, in some instances, be hard-coded into the packet processors 620. For instance, the device 600 may be configured to always react to certain types of data units in certain circumstances in a certain way. The forwarding logic, or portions thereof, may also be configurable, in that the logic changes over time in response to data collected from or instructions received from other nodes in the network in which the device 600 is located.

For example, a device 600 will typically store in its memories one or more forwarding tables (or equivalent structures) that map certain data unit attributes or characteristics to actions to be taken with respect to data units having those attributes or characteristics, such as sending the data unit to a selected path, or processing the data unit using a specified internal component. For instance, such attributes or characteristics may include a Quality-of-Service level specified by the data unit or associated with another characteristic of the data unit, a flow control group, an ingress port 610 through which the data unit was received, a tag or label in the packet's header, a source address, a destination address, a packet type, or any other suitable distinguishing property.

In an embodiment, forwarding logic may read port state data. Port state data may include, for instance, flow control state information describing various traffic flows and associated traffic flow control rules or policies, link status information indicating links that are up or down, port utilization information indicating how ports are being utilized (e.g. utilization percentages, utilization states, etc.). Forwarding logic may be configured to implement the associated rules or policies associated with the flow(s) to which a given packet belongs.

As data units are routed through different nodes in a network, the nodes may, on occasion, discard, fail to send, or fail to receive data units, thus resulting in the data units failing to reach their intended destination. The act of discarding of a data unit, or failing to deliver a data unit, is typically referred to as "dropping" the data unit. Instances of dropping a data unit, referred to herein as "drops" or "packet loss," may occur for a variety of reasons, such as resource limitations, errors, or deliberate policies.

According to an embodiment, the forwarding logic reads certain instructions for handling network traffic from one or more tables. Generally, the tables describe groups of one or more addresses, such as subnets of IPv4 or IPv6 addresses. Each address is an address of a network device on a network, though a network device may have more than one address. Each group is associated with a potentially different set of one or more actions to execute with respect to data units that resolve to (e.g. are directed to) an address within the group. Any suitable set of one or more actions may be associated with a group of addresses, including without limitation, forwarding a message to a specified "next hop," duplicating the message, changing the destination of the message, dropping the message, performing debugging or statistical operations, applying a quality of service policy or flow control policy, and so forth.

For illustrative purposes, these tables are described as "forwarding tables," though it will be recognized that the extent of the action(s) described by the tables may be much greater than simply where to forward the message. For example, in an embodiment, a table may be a basic forwarding table that simply specifies a next hop for each group. In other embodiments, a table may describe one or more complex policies for each group. Moreover, there may be different types of tables for different purposes. For instance, one table may be a basic forwarding table that is compared to the destination address of each packet, while another table may specify policies to apply to packets upon ingress based on their destination (or source) group, and so forth.

In an embodiment, system 600 comprises path management control logic that is configured to adjust the forwarding instructions described by a forwarding table based on a variety of factors. For example, path management control logic may be configured to recognize administrative commands that explicitly instruct the path management control logic to add or remove address groups or adjust existing instructions for a group. Path management control logic may also adjust forwarding instructions in response to events that imply changes to the forwarding instructions, such as the receipt of data units that announce the availability of new paths in a network, the dropping of a certain number of packets to a destination, the application of certain flow control measures, or any other suitable event.

In an embodiment, groups of addresses are described using an address prefix. This prefix is, in essence, a beginning address portion that is common to each address in the group. The beginning address portion may be, for instance, a first number of bits, bytes, or other element. As used herein, a "prefix entry" generally refers to a data entry (i.e. in a forwarding table) which maps a particular prefix to one or more actions to be performed with respect to network packets or other data structures associated with an input key (e.g. address) that matches the particular prefix. Thus, when determining how to handle a certain packet, forwarding logic may determine a group of addresses that a data packet is associated with (e.g. a destination subnet, source subnet, etc.) using a prefix, and perform the one or more actions associated with that group.

Traffic Management

Since not all packets 605 received by the device 600 can be processed by the packet processor(s) 620 at the same time, a traffic manager 621 of device 600 may temporarily store packets 605 in memory structures referred to as buffers 622 while the packets 605 are waiting to be processed. For example, a certain egress packet processor 620*b* may only be capable of processing a certain number of packets 605, or portions of packets 605, in a given clock cycle, meaning that other packets 605, or portions of packets 605, must either be ignored (i.e. dropped) or stored. At any given time, a large number of packets 605 may be stored in the buffers 622 of the device 600, depending on network traffic conditions.

Buffers 622, depicted in FIG. 6 as individual buffers 622*a*-*n*, collectively form a buffer memory 630. Each buffer 622 may be a portion of any type of memory, including volatile memory and/or non-volatile memory. In an embodiment, each buffer 622 is a distinct single-ported memory. Single-ported memories may be utilized for speed, though in other embodiments multi-ported memories may be used instead. In an embodiment, each of these buffers 622 is capable of being accessed concurrently with each other buffer 622, though full realization of this capability is not necessary. In an embodiment, each buffer is a distinct memory bank, or set of memory banks. In yet other embodiments, a buffer may be a region within a memory bank. In an embodiment, each buffer comprises many addressable "slots" or "entries" (e.g. rows, columns, etc.) in which packets 605, or portions thereof, may be stored.

The traffic manager 621 may include a buffer manager configured to manage use of buffers 622 by device 600. Among other processing tasks, the buffer manager may, for example, allocate and deallocate specific segments of memory for buffers 622, create and delete buffers 622 within that memory, identify available buffer(s) 622 in which to store a newly received packet 605, maintain a mapping of buffers 622 to packets 605 stored in those buffers 622 (e.g. by a packet sequence number assigned to each packet 605 as the packet 605 is received), mark a buffer 622 as available when a packet 605 stored in that buffer 622 is dropped or sent from the device 600, determine when to drop a packet 605 instead of storing the packet 605 in a buffer 622, perform garbage collection on packets 605 (or portions thereof) that are no longer needed, and so forth.

In an embodiment, the traffic manager 621 is coupled to the ingress packet processor(s) 620a, such that packets 605 (or portions thereof) are assigned to buffers 622 only upon being initially processed by a packet processor 620a. Once in a buffer 622, a packet 605 (or portion thereof) may be "released" to one or more egress packet processor(s) 620b for processing, either by the traffic manager 624 sending a link or other suitable addressing information for the corresponding buffer 622 to the egress packet processor 620b, or by sending the packet 605 directly.

In an embodiment, to manage the order in which packets 605 are processed from the buffers 622, traffic manager 621 implements queueing logic. Each packet 605, or the buffer locations(s) in which it is stored, is said to belong to one or more constructs referred to as queues 624. Typically, a queue 624 is a set of memory locations (i.e. in buffers 622) arranged in some order by metadata describing the queue. The memory locations may (and often are) non-contiguous relative to their addressing scheme and/or physical arrangement. For example, the metadata for one queue may indicate that the queue is comprised of, in order, buffers 1, 50, 3, and 72.

A device 600 may have many queues 624, and each packet processor 620 (or the traffic manager 621) may be associated with one or more of the queues 624 to regulate which packet 605 is processed at which time. The sequence in which the queue 624 arranges its constituent packets 605 generally corresponds to the sequence in which the packets 605 in the queue 624 will be processed. In some embodiments, the number of packets 605 assigned to a given queue 624 at a given time may be limited, either globally or on a per-queue basis, and this limit may change over time.

Beyond managing the use of buffers 622 to store packets 605 (or copies thereof), the traffic manager 621 may assign buffers 622 to queues 624 and manage the flow of packets 605 through the queues 624. The traffic manager 621 may, for instance, identify a specific queue 624 to assign a packet 605 to upon ingress of the packet 605. The traffic manager 621 may further determine when to release—also referred to as "dequeuing"—packets 605 (or portions thereof) from queues 624 and provide that data to specific packet processor(s) 620. The traffic manager 621 may further "deallocate" entries in buffer 622 that are no longer being utilized when the data stored within those entries are dequeued from their respective queues. These entries are then reclaimed for use in storing new data. This process of deallocating and reclaiming buffer entries is referred to as garbage collection.

In an embodiment, different queues 624 may exist for different destinations. For example, each port 610 and/or port 690 may have its own set of queues 624. The queue 624 to which an incoming packet 605 is assigned may therefore be selected based on the port 610 through which it was received, while the queue 624 to which an outgoing packet is assigned may be selected based on forwarding information indicating which port 690 the packet should depart from. A different packet processor may be associated with each different set of one or more queues 624. Hence, the current processing context of the packet 605 may be used to select which queue 624 a packet 605 should be assigned to.

In an embodiment, there may also or instead be different queues 624 for different flows or sets of flows. That is, each identifiable traffic flow or group of traffic flows is assigned its own set of queues 624 to which its packets 605 are respectively assigned. In an embodiment, different queues 624 may correspond to different classes of traffic or quality-of-service (QoS) levels. Different queues 624 may also or instead exist for any other suitable distinguishing property of the packets 605, such as source address, destination address, packet type, and so forth.

For instance, a data unit may be forwarded to another queue 624 associated with another processing stage implemented by another set of processing components, sent out of the device 600 over an outbound port 690, discarded, delayed for flow control reasons, and so forth. The collective actions of these processing components over these multiple stages is said to implement the forwarding logic of the device 600.

Though only one pair of packet processors 620 and a single traffic manager 621 are depicted, a device 600 may comprise any number of packet processors 620 and traffic managers 621. For instance, different sets of ports 610 and/or ports 690 may have their own traffic manager 621 and packet processors 620. As another example, in an embodiment, the traffic manager 621 may duplicated for some or all of the stages of processing a packet. For example, a traffic manager 621 and egress packet processor 620b for an egress stage performed upon the packet 605 exiting the system 600, and/or a traffic manager 621 and packet processor 620 for any number of intermediate stages. The packet 605 may thus pass through any number of traffic managers 621 and/or packet processors 620 prior to exiting the system 600. In other embodiments, only a single traffic manager 621 is needed. If intermediate processing is needed, flow of a packet 605 may "loop back" to the traffic manager 621 for buffering after each stage of intermediate processing.

An example flow of a packet 605 through device 600 is as follows. The packet 605 may be received by a port 610. The packet 605 is then processed by an ingress packet processor 620a, and then delivered to a traffic manager 621. Traffic manager 621 stores the packet 605 in a buffer 622 and assigns the packet 605 to a queue 624. Traffic manager 621 manages the flow of the packet 605 through the queue 624 until the packet 605 is released to an egress packet processor 620b. Depending on the processing, the traffic manager 621 may then assign the packet 605 to another queue 624 so that it may be processed by yet another processor 620, or the packet processor 620b may send the packet 605 out another port 690.

In the course of processing a packet 605, a device 600 may replicate a packet 605 one or more times. For example, a packet 605 may be replicated for purposes such as multicasting, mirroring, debugging, and so forth. Thus, a single packet 605 may be replicated to multiple queues 624. Hence, though certain techniques described herein may refer to the original packet 605 that was received by the device 600, it will be understood that those techniques will equally apply to copies of the packet 605 that have been generated for various purposes. A copy of a packet 605 may be partial or complete. Moreover, there may be actual physical comprises of the packet 605 in buffers 622, or a single copy of the packet 605 may be linked from a single buffer location 622 to multiple queues 624 at the same time.

Buffer Assignment Logic

Device 600 includes buffer assignment logic in the buffer manager of traffic manager 621 and/or in each ingress packet processor 620a. The buffer assignment logic is configured to identify which buffer should be utilized to store a given packet 605, or portion thereof. In some embodiments, each packet 605 is stored in a single entry within its assigned buffer. In yet other embodiments, a packet 605 is received as, or divided into, constituent data units such as fixed-size cells or frames. The buffers 622 may store these constituent data units separately (e.g. not in the same location, or even the same buffer). The constituent data units may even pass through queues 624 separately. In view of these variations between embodiments, to simplify the remainder of this description, the buffer assignment logic will simply be said to assign different data units to different buffers, which data units may be complete packets 605, or subunits thereof, depending on the embodiment.

In some embodiments, the buffer assignment logic is relatively simple, in that data units are assigned to buffers randomly or using a round-robin approach. In some embodiments, data units are assigned at least partially based on characteristics of those data units, such as corresponding traffic flows, destination addresses, source addresses, ingress ports, and/or other metadata. For example, different buffers or sets of buffers may be utilized to store data units received from different ports or sets of ports.

In an embodiment, the buffer assignment logic also or instead utilizes buffer utilization metrics to determine which buffer to assign to a data unit. The buffer utilization metrics, which are generated and stored or otherwise reported by an accounting mechanism, generally quantify a state of utilization for each buffer. States may range from actual counts of the number of buffers utilized, to percentages of total buffers utilized, to categorizations based on comparing the foregoing to predefined thresholds (e.g. full, overutilized, normal, underutilized, empty, etc.). The accounting mechanism may report the utilization of each buffer to the buffer assignment logic so that the buffer assignment logic may avoid assigning new data units to buffers that are already full, or close to becoming full.

However, in some embodiments, such an accounting mechanism may be expensive to implement, particularly where many buffers are utilized. To reduce the expense of such accounting mechanisms, the accounting mechanism may only report utilization of a buffer at intermittent times (e.g. for one buffer one clock cycle, for a second buffer another clock cycle, etc.). Alternatively, or additionally, the accounting mechanism may report only the approximate utilization of a buffer. A variety of suitable accounting mechanisms exist in which resource utilization, such as buffer utilization, is tracked on a delayed, staggered, or otherwise approximate basis instead of in real-time. Some examples of such mechanisms are described in the patent applications mentioned in previous sections.

7.3. Example Computing Device

Figure 7:
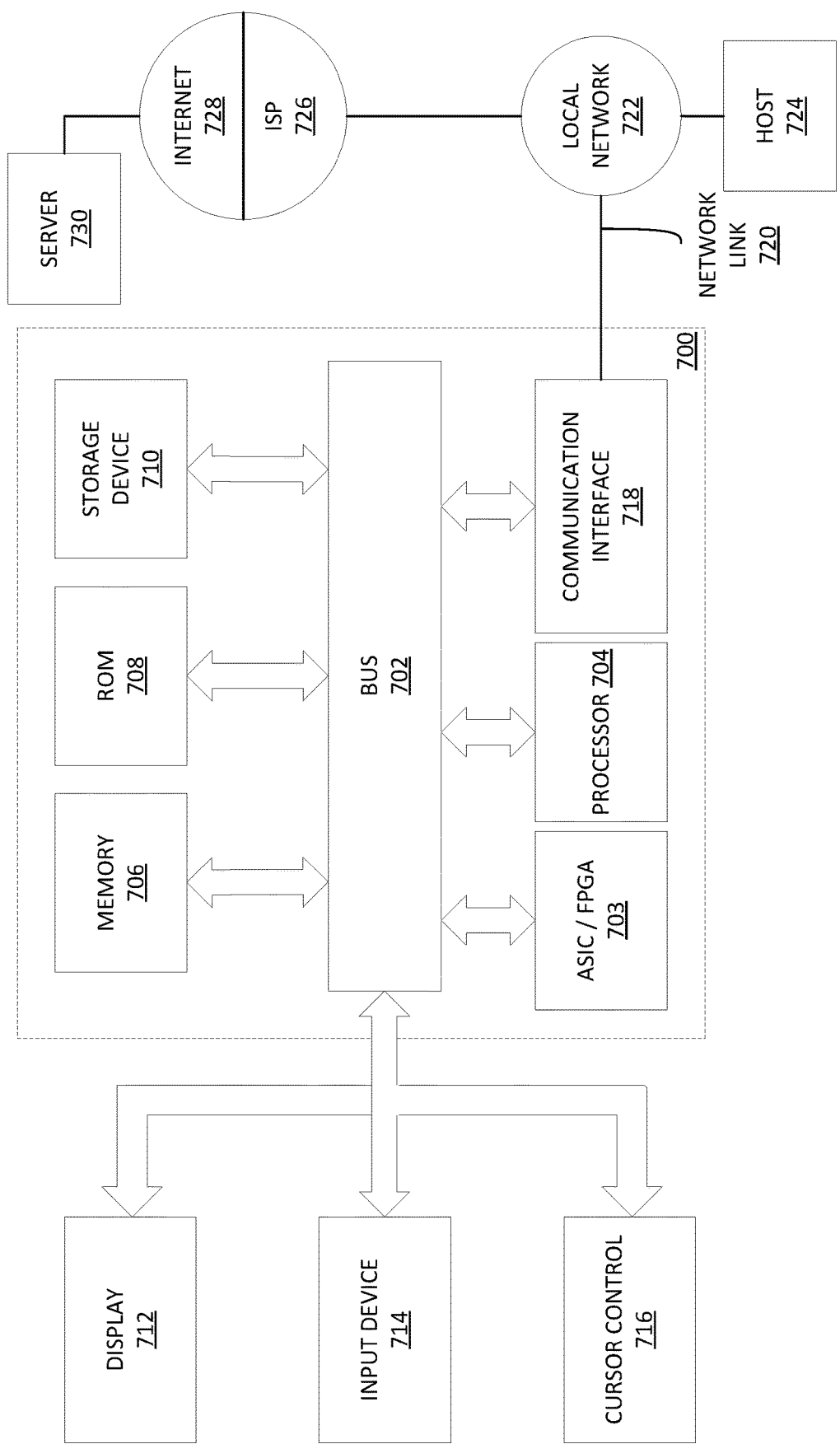
FIG. 7 is block diagram of a computer system upon which embodiments of the inventive subject matter may be implemented.

FIG. 7 is a block diagram that illustrates a computer system 700 that may be utilized in implementing the above-described techniques, according to an embodiment. Computer system 700 may be, for example, a desktop computing device, laptop computing device, tablet, smartphone, server appliance, computing mainframe, multimedia device, handheld device, networking apparatus, or any other suitable device. In an embodiment, FIG. 7 and FIG. 2 are both different views of a same networking device. In an embodiment, FIG. 7 may be any other type of computing device configured to implement system 100 and/or subsystem 300.

Computer system 700 may include one or more ASICs, FPGAs, or other specialized circuitry 703 for implementing program logic as described herein. For example, circuitry 703 may include fixed and/or configurable hardware logic blocks for implementing some or all of the described techniques, input/output (I/O) blocks, hardware registers or other embedded memory resources such as random access memory (RAM) for storing various data, and so forth. The logic blocks may include, for example, arrangements of logic gates, flip-flops, multiplexers, and so forth, configured to generate an output signals based on logic operations performed on input signals.

Additionally, and/or instead, computer system 700 may include one or more hardware processors 704 configured to execute software-based instructions. Computer system 700 may also include one or more busses 702 or other communication mechanism for communicating information. Busses 702 may include various internal and/or external components, including, without limitation, internal processor or memory busses, a Serial ATA bus, a PCI Express bus, a Universal Serial Bus, a HyperTransport bus, an Infiniband bus, and/or any other suitable wired or wireless communication channel.

Computer system 700 also includes one or more memories 706, such as a RAM, hardware registers, or other dynamic or volatile storage device for storing data units to be processed by the one or more ASICs, FPGAs, or other specialized circuitry 703. Memory 706 may also or instead be used for storing information and instructions to be executed by processor 704. Memory 706 may be directly connected or embedded within circuitry 703 or a processor 704. Or, memory 706 may be coupled to and accessed via bus 702. Memory 706 also may be used for storing temporary variables, data units describing rules or policies, or other intermediate information during execution of program logic or instructions.

Computer system 700 further includes one or more read only memories (ROM) 708 or other static storage devices coupled to bus 702 for storing static information and instructions for processor 704. One or more storage devices 710, such as a solid-state drive (SSD), magnetic disk, optical disk, or other suitable non-volatile storage device, may optionally be provided and coupled to bus 702 for storing information and instructions.

A computer system 700 may also include, in an embodiment, one or more communication interfaces 718 coupled to bus 702. A communication interface 718 provides a data communication coupling, typically two-way, to a network link 720 that is connected to a local network 722. For example, a communication interface 718 may be an integrated services digital network (ISDN) card, cable modem, satellite modem, or a modem to provide a data communication connection to a corresponding type of telephone line. As another example, the one or more communication interfaces 718 may include a local area network (LAN) card to provide a data communication connection to a compatible LAN. As yet another example, the one or more communication interfaces 718 may include a wireless network interface controller, such as a 802.11-based controller, Bluetooth controller, Long Term Evolution (LTE) modem, and/or other types of wireless interfaces. In any such implementation, communication interface 718 sends and receives electrical, electromagnetic, or optical signals that carry digital data streams representing various types of information.

Network link 720 typically provides data communication through one or more networks to other data devices. For example, network link 720 may provide a connection through local network 722 to a host computer 724 or to data equipment operated by a Service Provider 726. Service Provider 726, which may for example be an Internet Service Provider (ISP), in turn provides data communication services through a wide area network, such as the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

In an embodiment, computer system 700 can send messages and receive data through the network(s), network link 720, and communication interface 718. In some embodiments, this data may be data units that the computer system 700 has been asked to process and, if necessary, redirect to other computer systems via a suitable network link 720. In other embodiments, this data may be instructions for implementing various processes related to the described techniques. For instance, in the Internet example, a server 730 might transmit a requested code for an application program through Internet 728, ISP 726, local network 722 and communication interface 718. The received code may be executed by processor 704 as it is received, and/or stored in storage device 710, or other non-volatile storage for later execution. As another example, information received via a network link 720 may be interpreted and/or processed by a software component of the computer system 700, such as a web browser, application, or server, which in turn issues instructions based thereon to a processor 704, possibly via an operating system and/or other intermediate layers of software components.

Computer system 700 may optionally be coupled via bus 702 to one or more displays 712 for presenting information to a computer user. For instance, computer system 700 may be connected via an High-Definition Multimedia Interface (HDMI) cable or other suitable cabling to a Liquid Crystal Display (LCD) monitor, and/or via a wireless connection such as peer-to-peer Wi-Fi Direct connection to a Light-Emitting Diode (LED) television. Other examples of suitable types of displays 712 may include, without limitation, plasma display devices, projectors, cathode ray tube (CRT) monitors, electronic paper, virtual reality headsets, braille terminal, and/or any other suitable device for outputting information to a computer user. In an embodiment, any suitable type of output device, such as, for instance, an audio speaker or printer, may be utilized instead of a display 712.

One or more input devices 714 are optionally coupled to bus 702 for communicating information and command selections to processor 704. One example of an input device 714 is a keyboard, including alphanumeric and other keys. Another type of user input device 714 is cursor control 716, such as a mouse, a trackball, or cursor direction keys for communicating direction information and command selections to processor 704 and for controlling cursor movement on display 712. This input device typically has two degrees of freedom in two axes, a first axis (e.g., 3) and a second axis (e.g., y), that allows the device to specify positions in a plane. Yet other examples of suitable input devices 714 include a touch-screen panel affixed to a display 712, cameras, microphones, accelerometers, motion detectors, and/or other sensors. In an embodiment, a network-based input device 714 may be utilized. In such an embodiment, user input and/or other information or commands may be relayed via routers and/or switches on a Local Area Network (LAN) or other suitable shared network, or via a peer-to-peer network, from the input device 714 to a network link 720 on the computer system 700.

As discussed, computer system 700 may implement techniques described herein using customized hard-wired logic, one or more ASICs or FPGAs 703, firmware and/or program logic, which in combination with the computer system causes or programs computer system 700 to be a special-purpose machine. According to one embodiment, however, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and use a modem to send the instructions over a network, such as a cable network or cellular network, as modulated signals. A modem local to computer system 700 can receive the data on the network and demodulate the signal to decode the transmitted instructions. Appropriate circuitry can then place the data on bus 702. Bus 702 carries the data to main memory 706, from which processor 704 retrieves and executes the instructions. The instructions received by main memory 706 may optionally be stored on storage device 710 either before or after execution by processor 704.

8.0. EXTENSIONS AND ALTERNATIVES

As used herein, the terms "first," "second," "certain," and "particular" are used as naming conventions to distinguish queries, plans, representations, steps, objects, devices, or other items from each other, so that these items may be referenced after they have been introduced. Unless otherwise specified herein, the use of these terms does not imply an ordering, timing, or any other characteristic of the referenced items.

In the drawings, the various components are depicted as being communicatively coupled to various other components by arrows. These arrows illustrate only certain examples of information flows between the components. Neither the direction of the arrows nor the lack of arrow lines between certain components should be interpreted as indicating the existence or absence of communication between the certain components themselves. Indeed, each component may feature a suitable communication interface by which the component may become communicatively coupled to other components as needed to accomplish any of the functions described herein.

In the foregoing specification, embodiments of the inventive subject matter have been described with reference to numerous specific details that may vary from implementation to implementation. Thus, the sole and exclusive indicator of what is the inventive subject matter, and is intended by the applicants to be the inventive subject matter, is the set of claims that issue from this application, in the specific form in which such claims issue, including any subsequent correction. In this regard, although specific claim dependencies are set out in the claims of this application, it is to be noted that the features of the dependent claims of this application may be combined as appropriate with the features of other dependent claims and with the features of the independent claims of this application, and not merely according to the specific dependencies recited in the set of claims. Moreover, although separate embodiments are discussed herein, any combination of embodiments and/or partial embodiments discussed herein may be combined to form further embodiments.

Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A network device adapted for indicating status information of a network switching subsystem via a light-emitting diode ("LED") array, the network device comprising:
    a plurality of network interfaces;
    said network switching subsystem, comprising:
        one or more packet processors configured to where to forward packets received via the plurality of network interfaces;
        one or more buffer memories configured to temporarily store the packets while the packets await processing by the one or more packet processors; and
        a reporting component configured to collect status information of components of the network switching subsystem, generate status messages based on the collected status information, and send the status messages to a message decoder coupled to the network switching subsystem;
    said message decoder, configured to receive at least particular status messages generated by the reporting component, determine one or more manners in which to light particular LED indicators of the LED array based on the particular status messages, and send formatted output data to the LED array configured to cause the particular LED indicators of the LED array to light in the determined one or more manners.

2. The network device of claim 1, wherein each of the one or more manners corresponds to a particular behavior, state, or event indicated by one or more of the particular status messages, the one or more of manners including at least one of: whether to light one or more of the particular LED indicators, one or more colors to light the particular LED indicators, one or more intensities with which to light the particular LED indicators, a flicker rate for the particular LED indicators, a pattern for the particular LED indicators, and/or color transitions for the particular LED indicators.

3. The network device of claim 1, wherein the network switching subsystem and the message decoder are separate integrated circuits.

4. The network device of claim 1, wherein two or more of the particular LED indicators correspond to fields of the status messages, including two or more of: a link status, an activity indicator, a link speed, a signal detection indicator, an interface enabled indicator, or a fault state indicator.

5. The network device of claim 1, wherein the status messages include at least one of: a drop rate at which certain packets of the packets are dropped, one or more queue sizes of one or more queues of the packets stored in the one or more buffer memories, one or more delay measures, or one or more buffer fill levels for the one or more buffer memories, and the LED array includes one or more LED indicators corresponding to at least one of: the drop rate, the one or more queue sizes, the one or more delay measures, or the one or more buffer fill levels.

6. The network device of claim 1, further comprising the LED array, wherein the LED array includes a controller configured to send electrical current to specific LED indicators specified by the formatted output data, the electrical current causing the specific LED indicators to emit light for a period of time.

7. The network device of claim 1, wherein the status messages are generated in a common format that is independent of a configuration of the LED array, wherein the formatted output data is formatted in a custom format that is specific to the configuration of the LED array.

8. The network device of claim 1, further comprising multiple output devices, including the LED array, wherein the message decoder, or a second message decoder, is configured to receive at least second status messages from the network switching subsystem, and is further configured to determine second outputs of a second output device based on the second status messages, and to send second formatted output data to the second output device configured to cause the second output device to display the second outputs.

9. The network device of claim 1, further comprising a forwarding unit configured to forward at least some of the generated status messages to an external processor or microcontroller configured to perform one or more actions based on the forwarded status messages.

10. The network device of claim 1, wherein the reporting component comprises:
- a discrete data bus for reporting status information;
- a plurality of nodes coupled to the discrete data bus, the plurality of nodes configured to collect status information for components of the network switching subsystem to which they are connected or in which they are embedded, the plurality of nodes further configured to encode that status information and place the encoded status information on the data bus;
- a message generator configured to generate the status messages based on the encoded status information.

11. A method comprising:
- at a network switching subsystem of a network device, receiving packets via a plurality of network interfaces;
- temporarily storing the packets in one or more buffer memories of the network switching subsystem while the packets await processing at one or more packet processors of the network switching subsystem;
- using the one or more packet processors, determining where to forward the packets;
- collecting status information of components of the network switching subsystem;
- generating a status message based on the collected status information;
- receiving the status message at a message decoder;
- based on at least one field of data in the status message, the message decoder determining an LED indicator of an LED array to light, the LED indicator corresponding to a state indicated by the status message;
- sending, from the message decoder to the LED array, formatted output data configured to cause at least the LED indicator to light.

12. The method of claim 11, further comprising determining how to light the LED indicator, the formatted output data specifying to the LED array how to light the LED indicator, the manner in which the LED indicator is determined to be lit corresponding to a behavior, state, or event indicated by the status message, wherein determining how to light the LED indicator includes one or more of: determining one or more colors to light the LED indicator, determining an intensity with which to light the LED indicator, determining a flicker rate for the LED indicator, determining a pattern for the LED indicator, and/or determining a color transition for the LED indicator.

13. The method of claim 11, wherein the network switching subsystem and the message decoder are separate integrated circuits.

14. The method of claim 11, wherein the LED indicator corresponds to one of: a link status, an activity indicator, a link speed, a signal detection indicator, an interface enabled indicator, or a fault state indicator.

15. The method of claim 11, wherein the LED indicator corresponds to one of: a drop rate at which certain packets of the packets are dropped, one or more queue sizes of one or more queues of the packets stored in the one or more buffer memories, one or more delay measures, or one or more buffer fill levels for the one or more buffer memories.

16. The method of claim 11, further comprising, at a controller of the LED array, based on the formatted output data received from the message decoder, sending an electrical current to the LED indicator that causes the LED indicator to emit light for a period of time.

17. The method of claim 11, wherein the status message is generated in a common format that is independent of a configuration of the LED array, wherein the formatted output data is formatted in a custom format that is specific to the configuration of the LED array.

18. The method of claim 11, further comprising:
- receiving, at the message decoder or a second message decoder, a second status message from the network switching subsystem;
- determining a second output of a second output device based on the second status message;
- sending second formatted output data to the second output device configured to cause the second output device to display the second output.

19. The method of claim 11, further comprising forwarding a second status message from the network switching subsystem to an external processor or microcontroller configured to perform one or more actions based on the second status message.

20. The method of claim 11, further comprising generating the status message at the network switching subsystem by:
- collecting particular status information at each of a plurality of nodes within the network switching subsystem, each of the plurality of nodes coupled to or embedded within one or more components to which the particular status information pertains;
- at each of the plurality of nodes, encoding the particular status information;
- placing the encoded status information on a discrete status bus coupled to each of the plurality of nodes;
- at a message generator of the network switching subsystem, generating the status message based on the encoded status information.

21. A method of manufacturing a network device, comprising:
- connecting a network switching circuit to a message decoding circuit;
- wherein the network switching circuit comprises:
  - one or more packet processors configured to determine where to forward packets received via the plurality of network interfaces;
  - one or more buffer memories configured to temporarily store the packets while the packets await processing by the one or more packet processors; and
  - a reporting component configured to collect status information of components of to the network switching subsystem, generate status messages based on the collected status information, and send the status messages to the message decoding circuit;
- wherein the message decoding circuit is a programmable logic device;
- connecting the message decoding circuit to an LED array, the LED array comprising an LED matrix driver and a plurality of LED indicators;
- programming the message decoding circuit to determine one or more manners in which to light particular LED indicators of the LED array based on particular status messages received from the network switching circuit, and to generate formatted output data configured to instruct the LED matrix driver to light the particular LED indicators based on the determining.

22. The method of claim 21, wherein the message decoding circuit is preprogrammed with logic to generate generic formatted output data that lights certain LED indicators in response to certain status messages, wherein programming the message decoding circuit comprises reprogramming the message decoding circuit to generate formatted output data in a format that is specific to the LED matrix driver and/or to determine additional times, not indicated by the preprogrammed logic, to light one or more LED indicators based on the particular status messages.

* * * * *

UNITED STATES PATENT AND TRADEMARK OFFICE
CERTIFICATE OF CORRECTION

PATENT NO. : 10,540,867 B1  
APPLICATION NO. : 15/729386  
DATED : January 21, 2020  
INVENTOR(S) : Shrikhande et al.

Page 1 of 1

It is certified that error appears in the above-identified patent and that said Letters Patent is hereby corrected as shown below:

In the Claims

Column 43  
Claim 1: Line 62: Delete "to" and insert --to determine--

Signed and Sealed this  
Twenty-fifth Day of February, 2020

Andrei Iancu  
*Director of the United States Patent and Trademark Office*